(12) United States Patent
Sakamoto

(10) Patent No.: US 10,914,753 B2
(45) Date of Patent: Feb. 9, 2021

(54) SAMPLE RACK CONVEYING APPARATUS AND AUTOMATED ANALYSIS SYSTEM

(71) Applicant: JEOL Ltd., Tokyo (JP)

(72) Inventor: Kenichi Sakamoto, Tokyo (JP)

(73) Assignee: JEOL Ltd., Tokyo (JP)

( * ) Notice: Subject to any disclaimer, the term of this patent is extended or adjusted under 35 U.S.C. 154(b) by 267 days.

(21) Appl. No.: 15/750,628

(22) PCT Filed: Aug. 12, 2016

(86) PCT No.: PCT/JP2016/073761
§ 371 (c)(1),
(2) Date: Feb. 6, 2018

(87) PCT Pub. No.: WO2017/026546
PCT Pub. Date: Feb. 16, 2017

(65) Prior Publication Data
US 2019/0018032 A1    Jan. 17, 2019

(30) Foreign Application Priority Data
Aug. 12, 2015    (JP) .................................. 2015-159706

(51) Int. Cl.
*G01N 35/04*    (2006.01)
*G01N 35/02*    (2006.01)
(Continued)

(52) U.S. Cl.
CPC ........... *G01N 35/04* (2013.01); *G01N 35/026* (2013.01); *B65B 35/00* (2013.01); *B65B 2210/00* (2013.01);
(Continued)

(58) Field of Classification Search
CPC . B65B 35/00; B65B 2210/00; B65G 2812/12; B65G 17/12; B65G 47/57;
(Continued)

(56) References Cited

U.S. PATENT DOCUMENTS 6,403,035 B1 *    6/2002    Caratsch ................ G01N 35/04
                                                                422/65
2006/0216198 A1    9/2006    Koike
(Continued)

FOREIGN PATENT DOCUMENTS

CN    103119451 A    5/2013
EP    2884286 A1    6/2016
(Continued)

OTHER PUBLICATIONS

Supplementary European Search Report issued in EP16835242 dated Mar. 14, 2019.
(Continued)

*Primary Examiner* — Benjamin R Whatley
(74) *Attorney, Agent, or Firm* — The Webb Law Firm

(57) ABSTRACT

This sample rack conveying apparatus is provided with a pusher unit, a linear motion guide, and a conveyance drive mechanism. The pusher unit has a base portion, a moving member, and a base-side guide. The base portion is supported by the linear motion guide so as to be movable in a first guide direction. The moving member is provided with a pusher that pushes a sample rack. The base-side guide supports the moving member such that the moving member is movable in a second guide direction that crosses the first guide direction.

6 Claims, 13 Drawing Sheets

(51) Int. Cl.
*B65G 47/82* (2006.01)
*B65G 17/12* (2006.01)
*B65G 47/57* (2006.01)
*G01N 35/00* (2006.01)
*G12B 3/00* (2006.01)
*B65B 35/00* (2006.01)
*B65D 3/00* (2006.01)
*B65D 61/00* (2006.01)
*B65G 25/08* (2006.01)

(52) U.S. Cl.
CPC .............. *B65D 3/00* (2013.01); *B65D 61/00* (2013.01); *B65G 17/12* (2013.01); *B65G 25/08* (2013.01); *B65G 47/57* (2013.01); *B65G 47/82* (2013.01); *B65G 2201/0235* (2013.01); *B65G 2812/12* (2013.01); *G01N 35/00* (2013.01); *G01N 35/02* (2013.01); *G01N 2035/0401* (2013.01); *G01N 2035/0415* (2013.01); *G01N 2035/0465* (2013.01); *G01N 2035/0467* (2013.01); *G01N 2035/0475* (2013.01); *G12B 3/00* (2013.01)

(58) Field of Classification Search
CPC .. B65G 47/82; B65G 2201/0235; B65D 3/00; B65D 61/00; G01N 35/04; G01N 35/026; G01N 35/00; G01N 35/02; G01N 2035/0467; G01N 2035/0465; G01N 2035/0401; G01N 2035/0475; G12B 3/00
See application file for complete search history.

(56) References Cited

U.S. PATENT DOCUMENTS

| | | | |
|---|---|---|---|
| 2006/0216199 A1* | 9/2006 | Koike | G01N 35/026 422/65 |
| 2012/0043183 A1 | 2/2012 | Hannessen | |
| 2013/0130369 A1* | 5/2013 | Wilson | G16B 99/00 435/289.1 |
| 2013/0195720 A1* | 8/2013 | Behnk | B65G 49/00 422/68.1 |
| 2015/0079695 A1* | 3/2015 | Pollack | G01N 35/0095 436/501 |
| 2015/0160249 A1* | 6/2015 | Bucher | G01N 35/026 422/65 |
| 2016/0047833 A1* | 2/2016 | Kurahara | G01N 35/026 422/65 |

FOREIGN PATENT DOCUMENTS

| | | |
|---|---|---|
| JP | 378657 A | 4/1991 |
| JP | 2001228158 A | 8/2001 |
| JP | 2006308560 A | 11/2006 |
| WO | 2010101463 A1 | 9/2010 |

OTHER PUBLICATIONS

Chinese office action cited in CN 201680047484 dated Mar. 24, 2020.

* cited by examiner

SAMPLE RACK CONVEYING APPARATUS AND AUTOMATED ANALYSIS SYSTEM

CROSS-REFERENCE TO RELATED APPLICATIONS

This application is the United States national phase of International Application No. PCT/JP2016/073761 filed Aug. 12, 2016, and claims priority to Japanese Patent Application No. 2015-159706 filed Aug. 12, 2015, the disclosures of which are hereby incorporated in their entirety by reference.

TECHNICAL FIELD

The present invention relates to a sample rack conveying apparatus for conveying a sample rack in which sample containers are stored and also to an automated analysis system including this sample rack conveying apparatus.

BACKGROUND ART

Hitherto, an automated analysis apparatus for quantitatively measuring specific substances contained in a sample, which is a biological sample, such as blood and urine, is known. The automated analysis apparatus utilizes sample containers in which samples are stored. Such an automated analysis apparatus includes a sample storage unit in which plural sample containers are stored and a reaction unit in which a sample and a reagent are caused to react with each other.

A sample rack conveying apparatus for conveying sample containers to the sample storage unit of the automated analysis apparatus is also known. The sample rack conveying apparatus conveys plural sample containers which are stored in a sample rack.

As a known sample rack conveying apparatus, the technology disclosed in PTL 1, for example, is disclosed. The technology disclosed in PTL 1 includes a first rack conveyor for linearly conveying a sample rack in one direction and a second rack conveyor for linearly conveying a sample rack in a second direction different from the direction of the first rack conveyor. In the technology disclosed in PTL 1, a sample rack is placed on the first rack conveyor or the second rack conveyor and is conveyed.

CITATION LIST

Patent Literature

PTL 1: Japanese Unexamined Patent Application Publication No. 3-78657

SUMMARY OF INVENTION

Technical Problem

By using the rack conveyors according to the technology disclosed in PTL 1, sample racks can be conveyed only linearly. Because of this configuration, to change the conveying direction of sample racks, plural rack conveyors and a direction turning mechanism are required, and plural drivers are also required.

In view of the above-described problem, it is an object of the present invention to provide a sample rack conveying apparatus and an automated analysis system which can change the conveying direction of a sample rack with a single driver.

Solution to Problem

To solve the above-described problem and to achieve the object of the present invention, a sample rack conveying apparatus of the present invention includes a pusher unit, a linear motion guide, and a conveyance drive mechanism. The pusher unit pushes a sample rack in which a sample container is stored so as to convey the sample rack. The linear motion guide supports the pusher unit such that the pusher unit is movable in a first guide direction. The conveyance drive mechanism moves the pusher unit in the first guide direction. The pusher unit includes a base portion, a moving member, and a base-side guide. The base portion is supported by the linear motion guide so as to be movable in the first guide direction. The moving member is provided with a pusher which presses the sample rack. The base-side guide is provided on the base portion and supports the moving member such that the moving member is movable in a second guide direction which crosses the first guide direction.

An automated analysis system of the present invention includes an automated analysis apparatus that analyzes a sample stored in a sample container, and a sample rack conveying apparatus that conveys a sample rack in which the sample container is stored. As the sample rack conveying apparatus, the above-described sample rack conveying apparatus is used.

Advantageous Effects of Invention

According to the sample rack conveying apparatus and the automated analysis system of the present invention, it is possible to change the conveying direction of a sample rack with a single driver.

DESCRIPTION OF EMBODIMENTS

Figure 1:
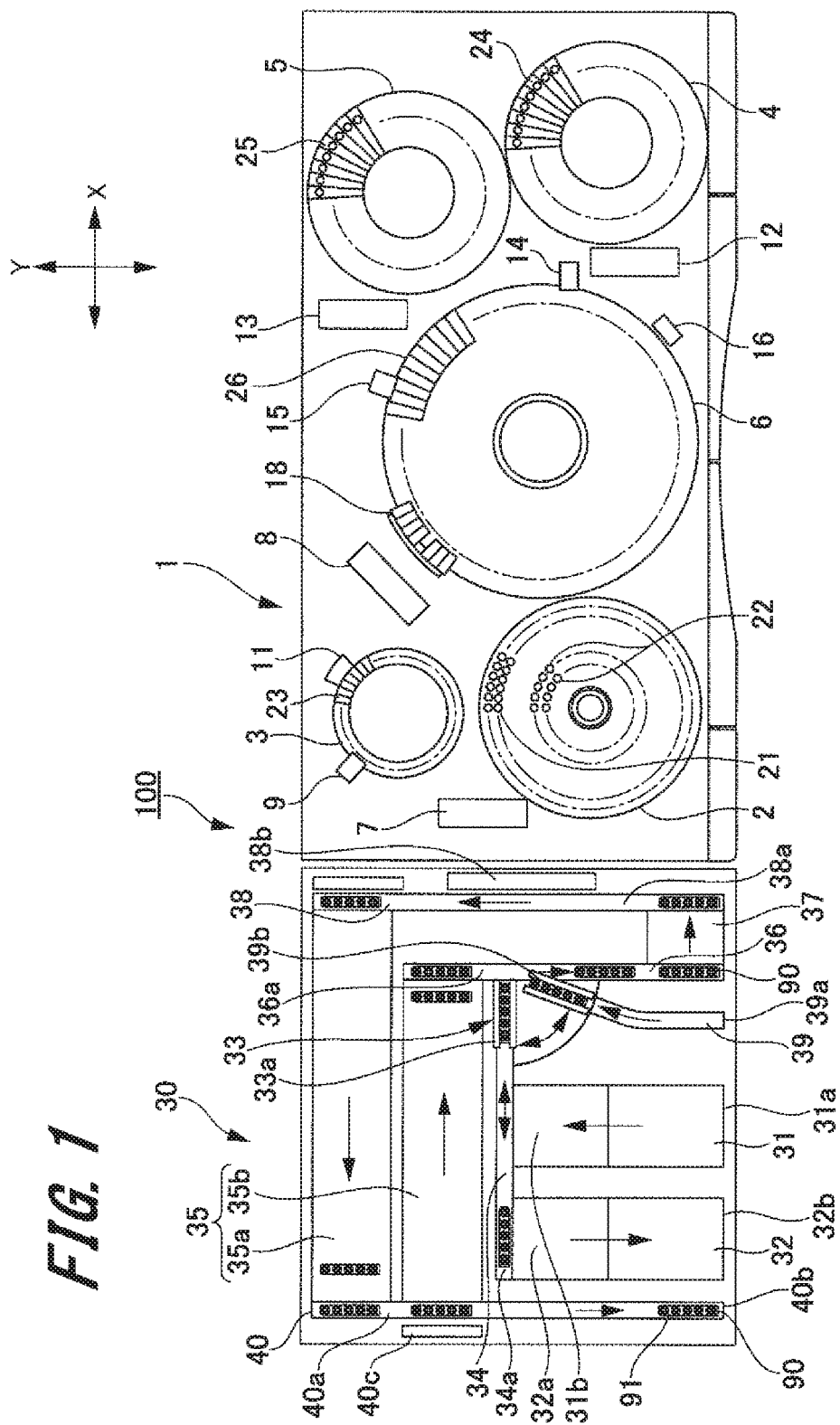
FIG. 1 is a plan view schematically illustrating an automated analysis system according to an embodiment of the present invention.

An embodiment of a sample rack conveying apparatus and an automated analysis system according to the present invention will be described below with reference to FIGS. 1 through 13. The same member illustrated in the individual drawings is designated by like reference numeral. The embodiment will be described in the following order. The present invention is not necessarily restricted to the following embodiment.

Embodiment 1-1. Configuration of Automated Analysis System

The automated analysis system according to an embodiment of the present invention (hereinafter called "this embodiment") will first be described below with reference to FIG. 1.

FIG. 1 schematically illustrates the automated analysis system according to this embodiment.

The apparatus shown in FIG. 1 is a biochemical analysis system 100 which is applied as an example of the automated analysis system according to the present invention. The biochemical analysis system 100 is an apparatus for automatically measuring the quantities of specific components contained in a biological sample, such as blood and urine.

As shown in FIG. 1, the biochemical analysis system 100 includes a biochemical analysis apparatus 1 and a sample rack conveying apparatus 30. The biochemical analysis apparatus 1 automatically measures the quantities of specific components contained in biological samples. The sample rack conveying apparatus 30 conveys sample racks.

1-2. Configuration of Biochemical Analysis Apparatus

The biochemical analysis apparatus 1 includes a sample turn table 2, a dilution turn table 3, a first reagent turn table 4, a second reagent turn table 5, and a reaction turn table 6. The biochemical analysis apparatus 1 also includes a sample dilution pipette 7, a sampling pipette 8, a dilution stirring device 9, a dilution cleaning device 11, a first reagent pipette 12, a second reagent pipette 13, a first reaction stirring device 14, a second reaction stirring device 15, a multiwavelength photometer 16, and a reaction-container cleaning device 18.

The sample turn table 2, which is an example of a sample storage unit of this embodiment, is formed as a container in a substantially cylindrical shape with one end opened in the axial direction. In this sample turn table 2, plural sample containers 21 and plural diluent containers 22 are stored. Samples, such as blood and urine, are stored in the sample containers 21. In the diluent containers 22, special diluents other than saline solution, which is a typical diluent, are stored.

The plural sample containers 21 are disposed with predetermined spaces therebetween in the circumferential direction of the sample turn table 2. The sample containers 21 disposed in the circumferential direction of the sample turn table 2 are arranged in two rows in the radial direction of the sample turn table 2 with predetermined spaces therebetween.

The plural diluent containers 22 are disposed farther inward in the radial direction than the plural rows of sample containers 21. The plural diluent containers 22, as well as the plural sample containers 21, are disposed with predetermined spaces therebetween in the circumferential direction of the sample turn table 2. The diluent containers 22 disposed in the circumferential direction of the sample turn table 2 are arranged in two rows in the radial direction of the sample turn table 2 with predetermined spaces therebetween.

Each set of the plural sample containers 21 and the plural diluent containers 22 is not necessarily disposed in two rows. Each set of the plural sample containers 21 and the plural diluent containers 22 may be disposed in one row or in three or more rows in the radial direction of the sample turn table 2.

The sample turn table 2 is supported by a drive mechanism, which is not shown, such that it is rotatable in the circumferential direction. The sample turn table 2 is rotated at a predetermined speed by every predetermined angle range in the circumferential direction by the drive mechanism, which is not shown. The dilution turn table 3 is disposed near the sample turn table 2.

As in the sample turn table 2, the dilution turn table 3, the first reagent turn table 4, the second reagent turn table 5, and the reaction turn table 6 are each formed as a container in a substantially cylindrical shape with one end opened in the axial direction. The dilution turn table 3 and the reaction turn table 6 are rotated at a predetermined speed by every predetermined angle range in the circumferential direction by the drive mechanism, which is not shown. The reaction turn table 6 is set to be rotated by half revolution or greater at one time.

In the dilution turn table 3, plural dilution containers 23 are stored sequentially in the circumferential direction of the dilution turn table 3. In the dilution containers 23, samples which are sucked from the sample containers 21 disposed in the sample turn table 2 and are diluted (hereinafter called "diluted samples") are stored.

In the first reagent turn table 4, plural first reagent containers 24 are stored sequentially in the circumferential direction of the first reagent turn table 4. In the second reagent turn table 5, plural second reagent containers 25 are stored sequentially in the circumferential direction of the second reagent turn table 5. A concentrated first reagent is stored in the first reagent containers 24, while a concentrated second reagent is stored in the second reagent containers 25.

The first reagent turn table 4, the first reagent containers 24, the second reagent turn table 5, and the second reagent containers 25 are maintained at a predetermined temperature by a cooling mechanism, which is not shown. The first reagent stored in the first reagent containers 24 and the second reagent stored in the second reagent containers 25 are accordingly cooled at a predetermined temperature.

The reaction turn table 6, which is an example of a reaction unit of this embodiment, is disposed between the dilution turn table 3 and the first and second reagent turn tables 4 and 5. In the reaction turn table 6, plural reaction containers 26 are stored sequentially in the circumferential direction of the reaction turn table 6. Diluted samples extracted from the dilution containers 23 in the dilution turn table 3, the first reagent extracted from the first reagent containers 24 in the first reagent turn table 4, and the second reagent extracted from the second reagent containers 25 in the second reagent turn table 5 are poured into the reaction containers 26. In the reaction containers 26, the diluted samples are stirred with the first and second reagents so that they can react with each other.

The sample dilution pipette 7 is disposed near the sample turn table 2 and the dilution turn table 3. The sample dilution pipette 7 is supported by a dilution pipette drive mechanism, which is not shown, such that it is movable in the axial direction (top-bottom direction, for example) of the sample turn table 2 and the dilution turn table 3. The sample dilution pipette 7 is also supported by the dilution pipette drive mechanism such that it is shiftable along a horizontal direction substantially parallel with the openings of the sample turn table 2 and the dilution turn table 3. By shifting along the horizontal direction, the sample dilution pipette 7 reciprocates between the sample turn table 2 and the dilution turn table 3. When the sample dilution pipette 7 shifts between the sample turn table 2 and the dilution turn table 3, it passes through a cleaning device, which is not shown.

The operation of the sample dilution pipette 7 will be described below.

When the sample dilution pipette 7 has reached a predetermined position above the opening of the sample turn table 2, it moves down along the axial direction of the sample turn table 2 and inserts a pipette portion provided at the tip of the sample dilution pipette 7 into a sample container 21. At this time, a sampling pump, which is not shown, is activated, and the sample dilution pipette 7 sucks a predetermined amount of sample stored in the sample container 21. Then, the sample dilution pipette 7 moves up along the axial direction of the sample turn table 2 and removes the pipette portion from the sample container 21. The sample dilution pipette 7 then shifts along the horizontal direction and moves to a predetermined position above the opening of the dilution turn table 3.

Then, the sample dilution pipette 7 moves down along the axial direction of the dilution turn table 3 and inserts the pipette portion into a predetermined dilution container 23. The sample dilution pipette 7 then ejects the sucked sample and a predetermined amount of diluent (saline solution, for example) supplied from the sample dilution pipette 7 to the dilution container 23. As a result, the sample is diluted by a predetermined dilution factor. The sample dilution pipette 7 is then cleaned by the cleaning device.

The sampling pipette 8 is disposed between the dilution turn table 3 and the reaction turn table 6. As in the sample dilution pipette 7, the sampling pipette 8 is supported by a sampling pipette drive mechanism, which is not shown, such that it is movable in the axial direction (top-bottom direction) of the dilution turn table 3 and is shiftable in the horizontal direction. The sampling pipette 8 reciprocates between the dilution turn table 3 and the reaction turn table 6.

The sampling pipette 8 inserts its pipette portion into a dilution container 23 in the dilution turn table 3 and sucks a predetermined amount of diluted sample. Then, the sampling pipette 8 ejects the sucked diluted sample to a reaction container 26 in the reaction turn table 6.

The first reagent pipette 12 is disposed between the reaction turn table 6 and the first reagent turn table 4, while the second reagent pipette 13 is disposed between the reaction turn table 6 and the second reagent turn table 5. The first reagent pipette 12 is supported by a first reagent pipette drive mechanism, which is not shown, such that it is movable in the axial direction (top-bottom direction) of the reaction turn table 6 and is shiftable in the horizontal direction. The first reagent pipette 12 reciprocates between the first reagent turn table 4 and the reaction turn table 6.

The first reagent pipette 12 inserts its pipette portion into a first reagent container 24 in the first reagent turn table 4 and sucks a predetermined amount of first reagent. Then, the first reagent pipette 12 ejects the sucked first reagent to a reaction container 26 in the reaction turn table 6.

As in the first reagent pipette 12, the second reagent pipette 13 is supported by a second reagent pipette drive mechanism, which is not shown, such that it is movable in the axial direction (top-bottom direction) of the reaction turn table 6 and is shiftable in the horizontal direction. The second reagent pipette 13 reciprocates between the second reagent turn table 5 and the reaction turn table 6.

The second reagent pipette 13 inserts its pipette portion into a second reagent container 25 in the second reagent turn table 5 and sucks a predetermined amount of second reagent. Then, the second reagent pipette 13 ejects the sucked second reagent to a reaction container 26 in the reaction turn table 6.

The dilution stirring device 9 and the dilution cleaning device 11 are disposed on the peripheral side of the dilution turn table 3. The dilution stirring device 9 inserts a stirrer, which is not shown, into a dilution container 23 and stirs a sample with a diluent.

The dilution cleaning device 11 is a device for cleaning dilution containers 23 from which diluted samples have been sucked by the sampling pipette 8. The dilution cleaning device 11 has plural dilution-container cleaning nozzles. The plural dilution-container cleaning nozzles are connected to a waste liquid pump, which is not shown, and a detergent pump, which is not shown. The dilution cleaning device 11 inserts the dilution-container cleaning nozzles into the dilution containers 23, and drives the waste liquid pump to suck diluted samples which remain within the dilution containers 23 by using the inserted dilution-container cleaning nozzles. The dilution cleaning device 11 then discharges the sucked diluted samples to a waste liquid tank, which is not shown.

Thereafter, the dilution cleaning device 11 supplies a detergent to the dilution-container cleaning nozzles from the detergent pump, and ejects the detergent from the dilution-container cleaning nozzles to the dilution containers 23 so as to clean the dilution containers 23. The dilution cleaning device 11 then sucks the detergent by using the dilution-container cleaning nozzles to dry the dilution containers 23.

The first reaction stirring device 14, the second reaction stirring device 15, and the reaction-container cleaning device 18 are disposed on the peripheral side of the reaction turn table 6. The first reaction stirring device 14 inserts a stirrer, which is not shown, into a reaction container 26 and stirs a diluted sample with the first reagent. This achieves uniform and speedy reaction of the diluted sample with the first reagent. The configuration of the first reaction stirring device 14 is the same as that of the dilution stirring device 9, and an explanation thereof will thus be omitted.

The second reaction stirring device 15 inserts a stirrer, which is not shown, into a reaction container 26 and stirs a diluted sample, the first reagent, and the second reagent with each other. This achieves uniform and speedy reaction of the diluted sample with the first reagent and the second reagent. The configuration of the second reaction stirring device 15 is the same as that of the dilution stirring device 9, and an explanation thereof will thus be omitted.

The reaction-container cleaning device 18 is a device for cleaning reaction containers 26 within which samples have been examined. The reaction-container cleaning device 18 has plural reaction-container cleaning nozzles. The plural reaction-container cleaning nozzles, as well as the dilution-container cleaning nozzles, are connected to a waste liquid pump, which is not shown, and a detergent pump, which is not shown. A cleaning process of the reaction-container cleaning device 18 is similar to that of the above-described dilution cleaning device 11, and an explanation thereof will thus be omitted.

The multi-wavelength photometer 16 is disposed such that it opposes the outer wall of the reaction turn table 6 on the peripheral side thereof. The multi-wavelength photometer 16 is inserted into a reaction container 26 to make optical measurements to a diluted sample reacted with the first reagent and the second reagent. The multi-wavelength photometer 16 then outputs the quantities of various components in the sample as numeric data in the form of "absorbance" so as to detect the reaction state of the diluted sample.

A constant-temperature bath, which is not shown, is disposed on the peripheral side of the reaction turn table 6. This constant-temperature bath maintains the inside of the reaction containers 26 provided in the reaction turn table 6 at a constant temperature.

1-3. Configuration of Sample Rack Conveying Apparatus

The detailed configuration of the sample rack conveying apparatus (hereinafter simply called "the conveying apparatus") 30 will now be discussed below.

As shown in FIG. 1, the conveying apparatus 30 is disposed adjacent to the biochemical analysis apparatus 1. The conveying apparatus 30 supplies samples to the sample containers 21 stored in the sample turn table 2. Containers to which the conveying apparatus 30 supplies samples are not restricted to the sample containers 21 stored in the sample turn table 2. The conveying apparatus 30 may instead supply samples directly to the dilution containers 23 in the dilution turn table 3. Samples to be supplied to the sample containers 21 are stored in rack-side sample containers 91. The rack-side sample containers 91 are stored in a sample rack 90. The sample rack 90 has a capacity for storing plural (five in this embodiment) rack-side sample containers 91. The conveying apparatus 30 conveys the sample rack 90 in which the rack-side sample containers 91 are stored.

A direction which is parallel with the horizontal direction and in which the conveying apparatus 30 and the biochemical analysis apparatus 1 are adjacent to each other is set to be a first direction X. A direction which is parallel with the horizontal direction and which crosses the first direction X at right angles is set to be a second direction Y.

The conveying apparatus 30 includes plural supply trays 31, plural recovery trays 32, a direction turning portion 33, a first conveyor lane 34, a recovery conveyor 35, and a second conveyor lane 36. The conveying apparatus 30 also includes a lane changing portion 37, a sample loading lane 38, an emergency sample loading portion 39, and a rack discharge lane 40.

The recovery trays 32 are disposed on a first side of the first direction X with respect to the conveying apparatus 30. The supply trays 31 are disposed closer to a second side of the first direction X than the recovery trays 32 are. The rack discharge lane 40 is disposed closer to the first side of the first direction X than the recovery trays 32 are.

In the supply trays 31, sample racks 90 are stored. A loading inlet 31*a* into which a sample rack 90 is loaded is provided on a first side of the second direction Y with respect to the supply tray 31. A discharge outlet 31*b* from which a sample rack 90 is discharged to the first conveyor lane 34 is provided on a second side of the second direction Y with respect to the supply tray 31.

The supply tray 31 conveys a sample rack 90 loaded from the loading inlet 31*a* to the discharge outlet 31*b*. The supply tray 31 discharges the sample rack 90 from the discharge outlet 31*b* to the first conveyor lane 34.

A receiving inlet 32*a* is provided on the second side of the second direction Y with respect to the recovery tray 32. A sample rack 90 conveyed from the first conveyor lane 34 is loaded into the receiving inlet 32*a*. The recovery tray 32 stores the sample rack 90 conveyed from the first conveyor lane 34. A discharge outlet 32*b* is provided on the first side of the second direction Y with respect to the recovery tray 32. The sample rack 90 stored in the recovery tray 32 is recoverable from the discharge outlet 32*b*.

The first conveyor lane 34 is disposed on the second side of the second direction Y with respect to the supply tray 31 and the recovery tray 32. The first conveyor lane 34 extends from the recovery tray 32 to the direction turning portion 33 along the first direction X.

The first conveyor lane 34 includes an endless conveyor belt 34*a* and a driver, which is not shown. The first conveyor lane 34 conveys a sample rack 90 placed on the conveyor belt 34*a* from the first side to the second side of the first direction X or from the second side to the first side of the first direction X.

The direction turning portion 33 is disposed on the second side of the first direction X with respect to the first conveyor lane 34. The first conveyor lane 34 conveys a sample rack 90 conveyed from the recovery tray 32 to the direction turning portion 33. The first conveyor lane 34 also conveys a sample rack 90 conveyed from the direction turning portion 33 to the receiving inlet 32*a* of the recovery tray 32.

The direction turning portion 33 includes an arm 33*a* for holding a sample rack 90. The direction turning portion 33 turns the conveying direction of a sample rack 90 held by the arm 33*a* by about 90 degrees. The direction turning portion 33 turns the conveying direction of a sample rack 90 conveyed from the first conveyor lane 34 from the first direction X to the second direction Y so as to convey the sample rack 90 from the first conveyor lane 34 to the second conveyor lane 36. The direction turning portion 33 also turns the conveying direction of a sample rack 90 conveyed from the second conveyor lane 36 from the second direction Y to the first direction X so as to convey the sample rack 90 from the second conveyor lane 36 to the first conveyor lane 34.

The direction turning portion 33 also turns the conveying direction of a sample rack 90 conveyed from the emergency sample loading portion 39, which will be discussed later, to the second direction Y, so as to convey the sample rack 90 from the emergency sample loading portion 39 to the second conveyor lane 36.

The second conveyor lane 36 is disposed on the second side of the first direction X with respect to the first conveyor lane 34 with the direction turning portion 33 interposed therebetween. The second conveyor lane 36 extends from the recovery conveyor 35, which will be discussed later, to the lane changing portion 37 along the second direction Y.

As in the first conveyor lane 34, the second conveyor lane 36 includes an endless conveyor belt 36*a* and a driver, which is not shown. On the conveyor belt 36*a*, sample racks 90 conveyed from the direction turning portion 33 or the recovery conveyor 35, which will be discussed later, are placed.

The second conveyor lane 36 conveys a sample rack 90 conveyed from the recovery conveyor 35 to the direction turning portion 33 along the second direction Y. The second conveyor lane 36 also conveys a sample rack 90 conveyed from the direction turning portion 33 to the lane changing portion 37 along the second direction Y.

The lane changing portion 37 moves a sample rack 90 conveyed by the second conveyor lane 36 along the first direction X and feeds the sample rack 90 from the second conveyor lane 36 to the sample loading lane 38.

The sample loading lane 38 is disposed closer to the second side of the first direction X than the second conveyor lane 36 is. As in the first conveyor lane 34 and the second conveyor lane 36, the sample loading lane 38 includes an endless conveyor belt 38a, a driver, which is not shown, and a sample loading portion 38b. The conveyor belt 38a of the sample loading lane 38 extends from the first side to the second side of the second direction Y with respect to the conveying apparatus 30. The sample loading lane 38 conveys a sample rack 90 placed on the conveyor belt 38a along the second direction Y.

The sample loading portion 38b is provided at an intermediate portion in the second direction Y with respect to the conveyor belt 38a. The sample loading lane 38 temporarily stops a sample rack 90 placed on the conveyor belt 38a at the sample loading portion 38b. Then, samples stored in the rack-side sample containers 91 are supplied to sample containers 21 stored in the sample turn table 2 by using a pipette provided in the biochemical analysis apparatus 1. The sample loading lane 38 then conveys the sample rack 90 from which the samples have been supplied at the sample loading portion 38b to the recovery conveyor 35 along the second direction Y.

The recovery conveyor 35 is disposed on the second side of the second direction Y with respect to the supply tray 31 and the recovery tray 32. The recovery conveyor 35 includes a first conveyor 35a and a second conveyor 35b. The first conveyor 35a is disposed closer to the second side of the second direction Y than the second conveyor 35b is.

The rack discharge lane 40 is disposed on the first side of the first direction X with respect to the recovery conveyor 35. The first conveyor 35a conveys a sample rack 90 conveyed from the sample loading lane 38 to the rack discharge lane 40 along the first direction X. The second conveyor 35b conveys a sample rack 90 conveyed by the rack discharge lane 40 and fed from a feeder 40c, which will be discussed later, to the second conveyor lane 36 along the first direction X.

A sample rack 90 that needs reexamining among sample racks 90 conveyed to the second conveyor lane 36 via the recovery conveyor 35 is again conveyed to the lane changing portion 37 by the second conveyor lane 36. The sample rack 90 conveyed to the lane changing portion 37 is again fed to the sample loading portion 38b by the sample loading lane 38.

The rack discharge lane 40 is disposed on the first side of the first direction X with respect to the conveying apparatus 30. The rack discharge lane 40 includes an endless conveyor belt 40a, a discharge outlet 40b, a feeder 40c, and a driver, which is not shown. The conveyor belt 40a of the rack discharge lane 40 extends from the first side to the second side of the second direction Y with respect to the conveying apparatus 30. The rack discharge lane 40 conveys sample racks 90 placed on the conveyor belt 40a along the second direction Y.

The feeder 40c is provided at an intermediate portion in the second direction Y with respect to the conveyor belt 40a. The feeder 40c feeds, among sample racks 90 conveyed by the conveyor belt 40a, sample racks 90 for which no abnormalities have been detected to the second conveyor 35b of the recovery conveyor 35.

The discharge outlet 40b is provided on the first side of the second direction Y with respect to the conveyor belt 40a. A sample rack 90 for which abnormalities have been detected passes through the feeder 40c and is conveyed to the discharge outlet 40b. This sample rack 90 is then removed from the discharge outlet 40b.

The emergency sample loading portion 39 is disposed between the supply tray 31 and the second conveyor lane 36. The emergency sample loading portion 39 is used for loading a sample rack 90 different from sample racks 90 stored in the supply tray 31. The emergency sample loading portion 39 conveys a sample rack 90 along the second direction Y, and then changes the conveying direction of the sample rack 90 in the vicinity of the direction turning portion 33 at a predetermined angle with respect to the second direction Y and then continues conveying the sample rack 90.

In the conveying apparatus 30 of this embodiment, the loading inlet 31a of the supply tray 31, the discharge outlet 32b of the recovery tray 32, the discharge outlet 40b of the rack discharge lane 40, and a loading inlet 39a of the emergency sample loading portion 39 are all disposed on the first side of the second direction Y with respect to the conveying apparatus 30. This enables a user to load and discharge sample racks 90 from the same side of the conveying apparatus 30, thereby enhancing the work efficiency.

1-4. Configuration of Emergency Sample Loading Portion

The detailed configuration of the emergency sample loading portion will be described below with reference to FIGS. 2 through 10.

Figure 2:
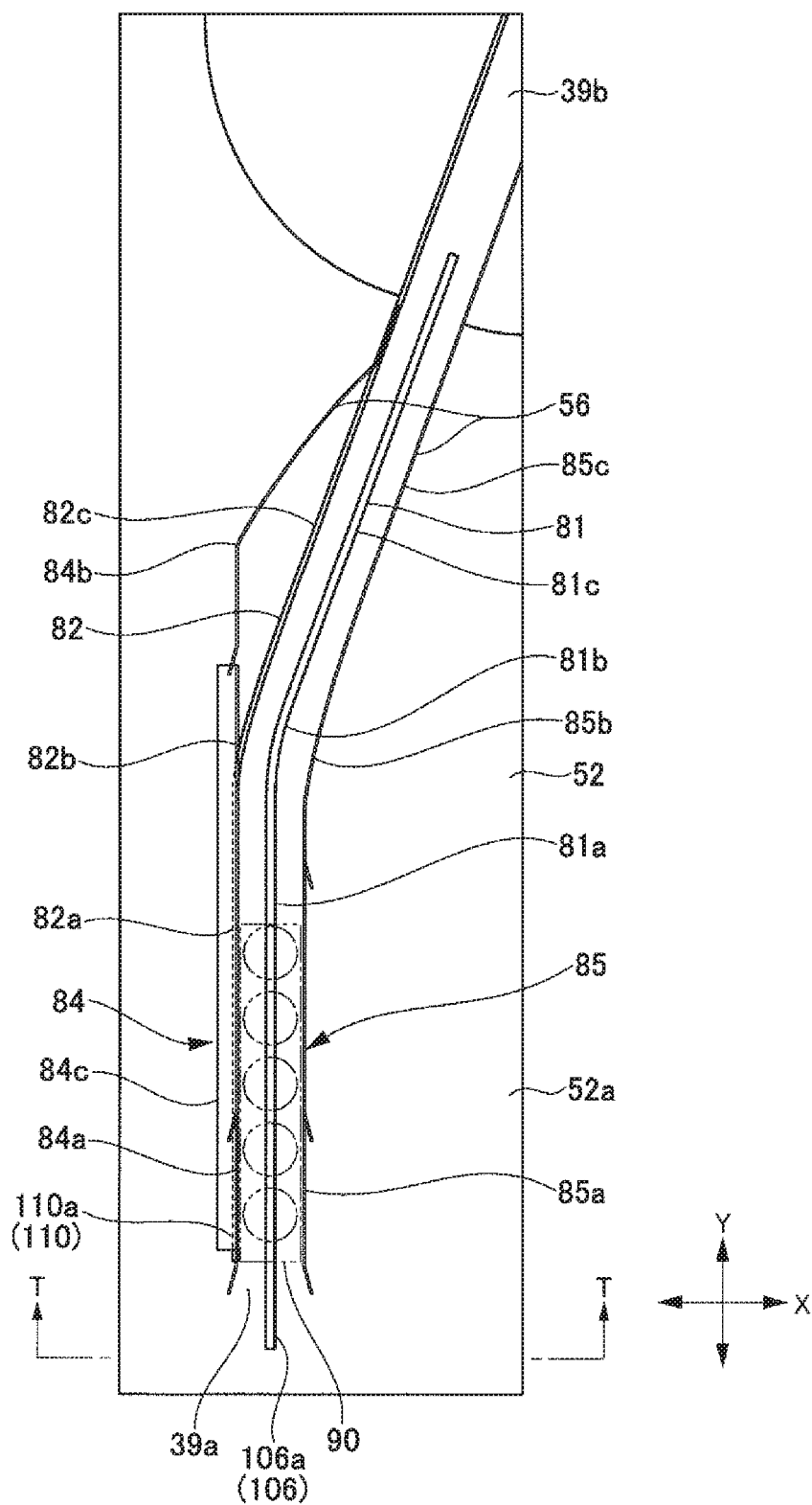
FIG. 2 is a plan view of a sample rack conveying apparatus according to the embodiment of the present invention.
Figure 3:
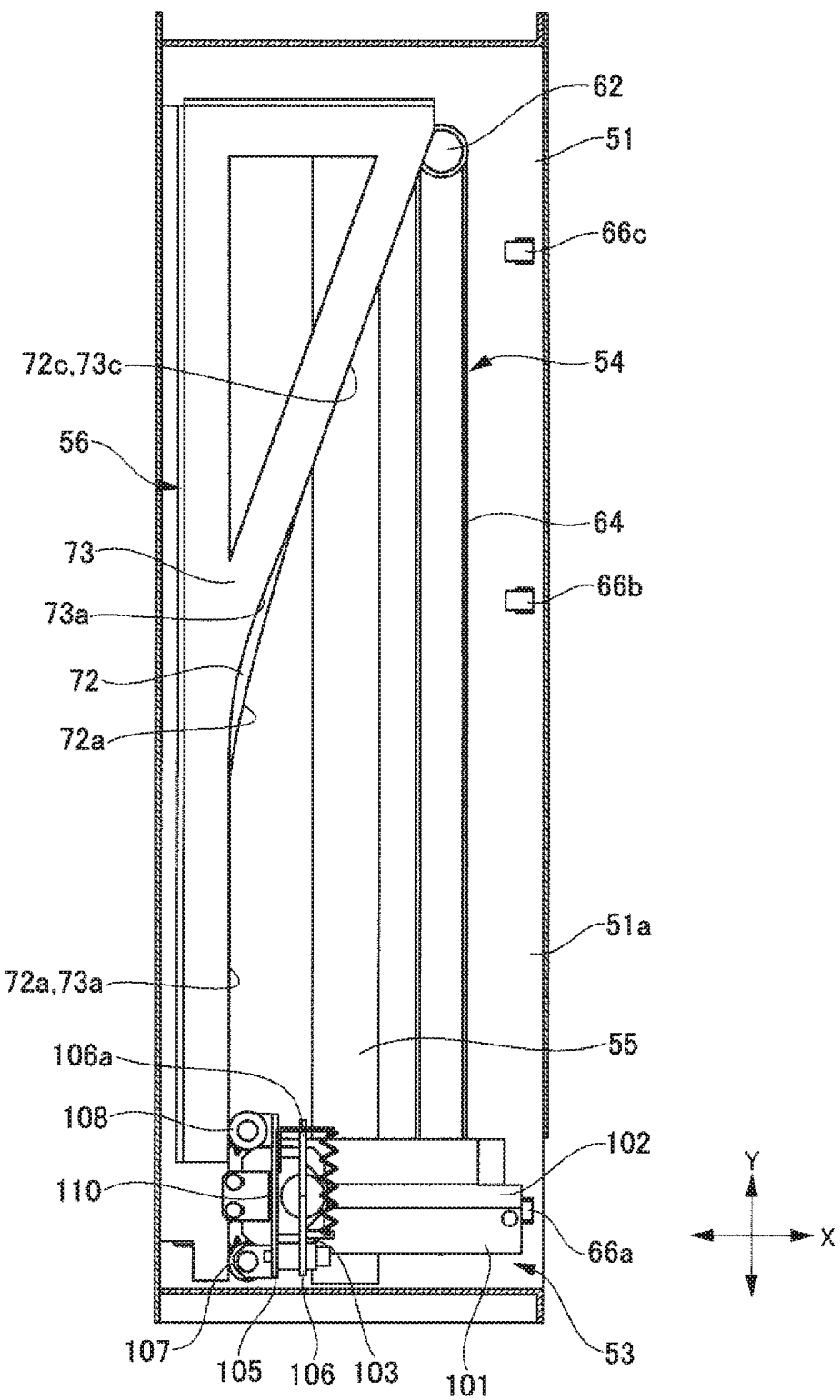
FIG. 3 is a plan view of the sample rack conveying apparatus from which a cover plate is removed according to the embodiment of the present invention.
Figure 4:
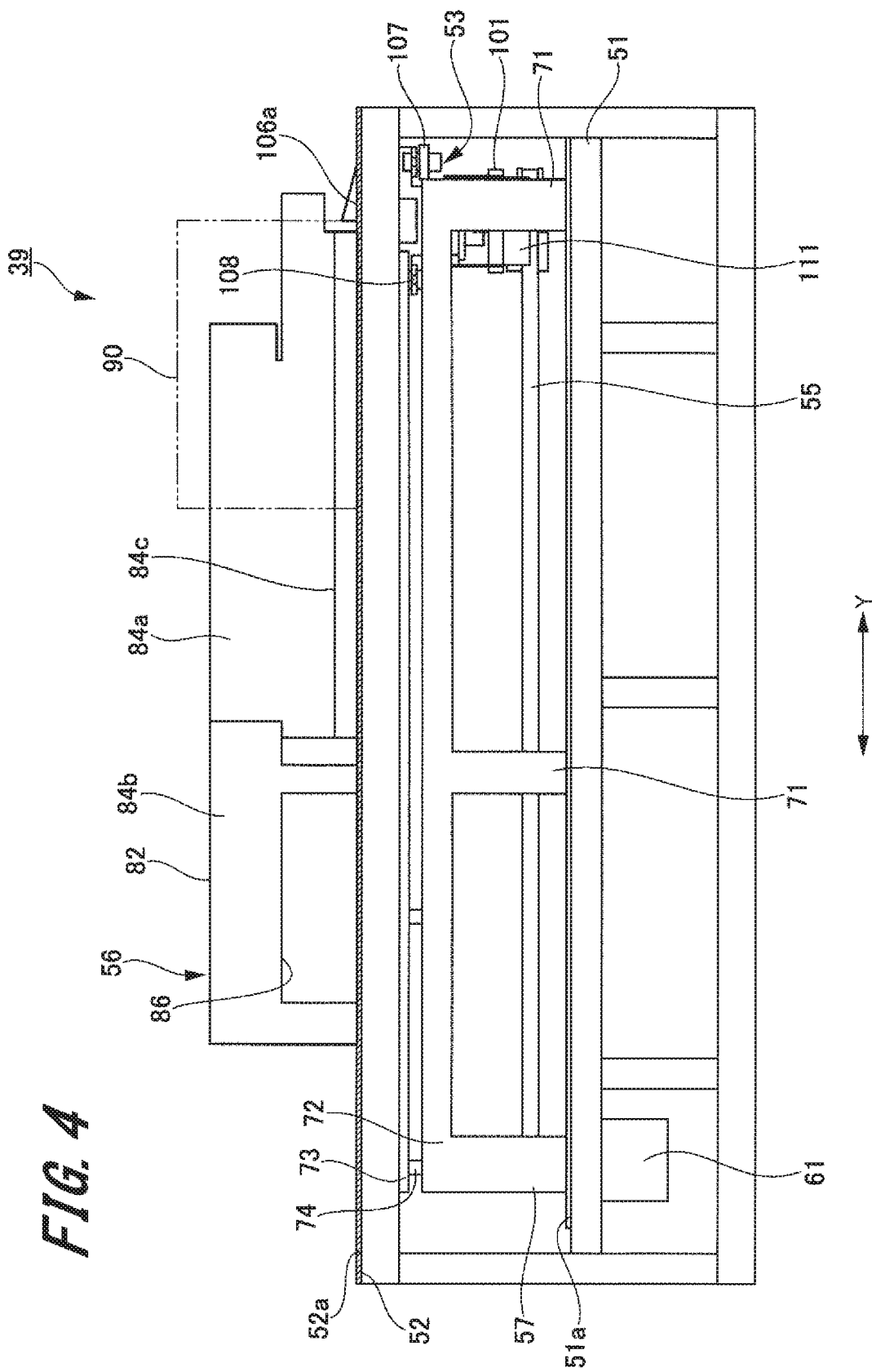
FIG. 4 is a left side view of the sample rack conveying apparatus according to the embodiment of the present invention.
Figure 5:
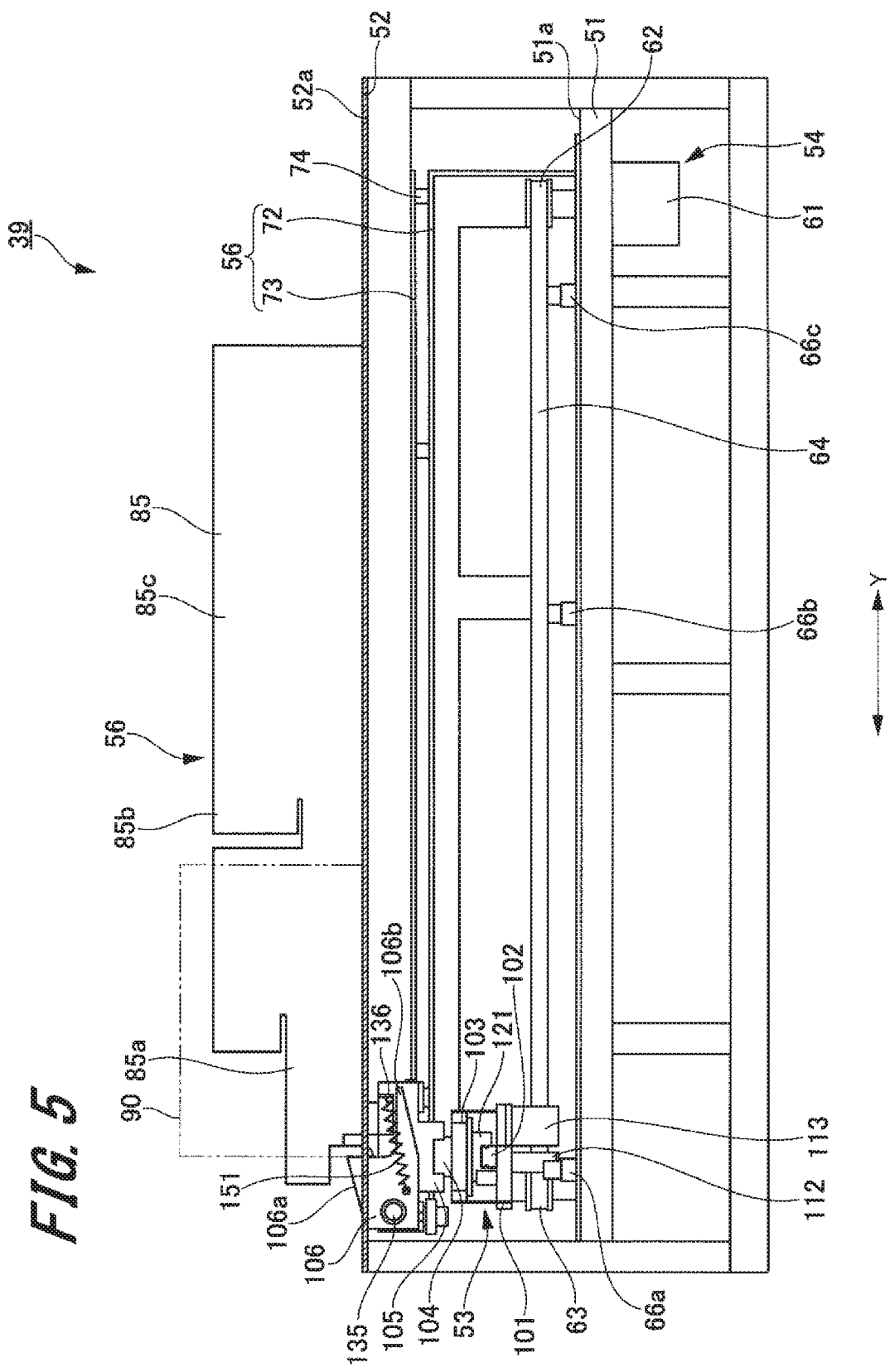
FIG. 5 is a right side view of the sample rack conveying apparatus according to the embodiment of the present invention.
Figure 6:
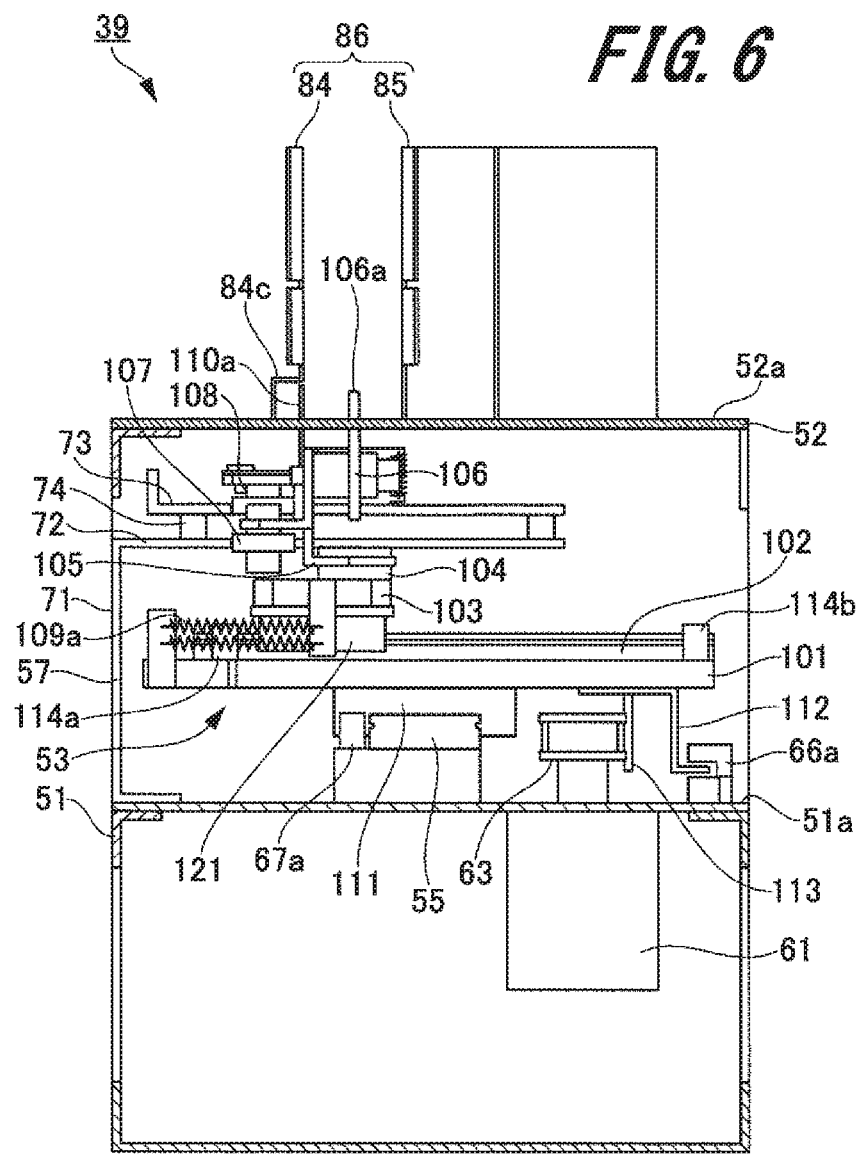
FIG. 6 is a sectional view taken along line T-T in FIG. 2 illustrating the sample rack conveying apparatus according to the embodiment of the present invention.

FIG. 2 is a plan view of the emergency sample loading portion 39. FIG. 3 is a plan view of the emergency sample loading portion 39 from which a cover plate 52 is removed. FIGS. 4 and 5 are side views of the emergency sample loading portion 39. FIG. 6 is a sectional view taken along line T-T in FIG. 2.

As shown in FIG. 2, the loading inlet 39a into which a sample rack 90 is loaded is disposed on the first side of the second direction Y and at an intermediate portion of the first direction X with respect to the emergency sample loading portion 39. A discharge outlet 39b from which a sample rack 90 is discharged is disposed on the second side of the second direction Y and on the second side of the first direction X with respect to the emergency sample loading portion 39. The discharge outlet 39b is connected to the direction turning portion 33.

As shown in FIGS. 2 through 6, the emergency sample loading portion 39 includes a support table 51, a cover plate 52, a pusher unit 53, and a conveyance drive mechanism 54. The emergency sample loading portion 39 also includes a linear motion guide 55, a rack guide 56 for guiding the conveying of a sample rack 90, and a unit guide 57.

As shown in FIGS. 3 through 6, the support table 51 has a mounting surface 51a formed in a substantially rectangular planar shape. The mounting surface 51a is disposed in substantially parallel with a plane formed by the first direction X and the second direction Y, that is, the horizontal direction. The conveyance drive mechanism 54 is provided on the support table 51.

The conveyance drive mechanism 54 moves the pusher unit 53, which will be discussed later, to the second direction Y, which is a first guide direction in this embodiment. The conveyance drive mechanism 54 includes a conveyance driver 61, a drive pulley 62, a driven pulley 63, and a drive belt 64. In this embodiment, as the conveyance driver 61, a stepper motor is used. The conveyance driver 61 is disposed on the second side of the second direction Y with respect to the support table 51.

The drive pulley 62 is interconnected to the drive shaft of the conveyance driver 61. The drive pulley 62 is placed on the mounting surface 51*a*. The rotating shaft of the drive pulley 62 is disposed substantially perpendicular to the mounting surface 51*a*. When the conveyance driver 61 drives, the drive pulley 62 is rotated.

The driven pulley 63 is rotatably provided on the first side of the second direction Y with respect to the mounting surface 51*a*. The rotating shaft of the driven pulley 63, as well as that of the drive pulley 62, is disposed substantially perpendicular to the mounting surface 51*a*.

The drive belt 64 is formed in an endless shape. The drive belt 64 is stretched over the drive pulley 62 and the driven pulley 63. The pusher unit 53, which will be discussed later, is interconnected to the drive belt 64 via an interconnecting member 113.

Three sensors 66*a*, 66*b*, and 66*c* are disposed on the mounting surface 51*a* and near the drive belt 64. The first sensor 66*a* is disposed on the first side of the second direction Y with respect to the mounting surface 51*a*. The third sensor 66*c* is disposed on the second side of the second direction Y with respect to the mounting surface 51*a*. The second sensor 66*b* is disposed between the first sensor 66*a* and the third sensor 66*c*.

Each of the three sensors 66*a*, 66*b*, and 66*c* is an optical sensor which includes a light emitting portion for emitting light and which receives light emitted from the light emitting portion. In this embodiment, optical sensors are used as the three sensors 66*a*, 66*b*, and 66*c*. However, the three sensors 66*a*, 66*b*, and 66*c* are not restricted to optical sensors, and mechanical sensors may be used instead.

On the mounting surface 51*a*, the linear motion guide 55 and the unit guide 57 are provided. The linear motion guide 55 extends from the first side to the second side of the second direction Y and at an intermediate portion of the first direction X with respect to the mounting surface 51*a*. The linear motion guide 55 supports the pusher unit 53, which will be discussed later, such that the pusher unit 53 is movable in the second direction Y, which is the first guide direction in this embodiment.

Two stoppers are provided near the liner motion guide 55. A first stopper 67*a* is disposed on the first side of the second direction Y with respect to the linear motion guide 55, while a second stopper is disposed on the second side of the second direction Y with respect to the linear motion guide 55. The first stopper 67*a* and the second stopper abut against the pusher unit 53, which will be discussed later, so that the pusher unit 53 can be prevented from dropping from the linear motion guide 55.

The unit guide 57 is disposed at an end of the mounting surface 51*a* on the first side of the first direction X. The unit guide 57 includes a leg portion 71 and planar-shaped first and second guide rails 72 and 73.

The leg portion 71 is fixed at an end of the mounting surface 51*a* on the first side of the first direction X. The leg portion 71 is raised from this end of the mounting surface 51*a* upward in the top-bottom direction perpendicular to the horizontal direction. The first guide rail 72 is continuously provided from the top end of the leg portion 71 in the top-bottom direction such that it is substantially perpendicular to the leg portion 71.

The first guide rail 72 includes a straight portion 72*a*, a curved portion 72*b*, and a tilting portion 72*c* formed along a path through which sample racks 90 are conveyed (hereinafter called "the conveying path"). The straight portion 72*a* extends in parallel with the second direction Y. The curved portion 72*b* is continuously provided from an end of the straight portion 72*a* on the second side of the second direction Y. The tilting portion 72*c* is continuously provided from an end of the curved portion 72*b* on the second side of the second direction Y, and tilts from the curved portion 72*b* toward the second side of the first direction X.

The second guide rail 73 is disposed above the first guide rail 72 in the top-bottom direction. The first guide rail 72 and the second guide rail 73 oppose each other in the top-bottom direction. The second guide rail 73 is fixed to the top surface of the first guide rail 72 in the top-bottom direction with a columnar portion 74 interposed therebetween.

As in the first guide rail 72, the second guide rail 73 includes a straight portion 73*a*, a curved portion 73*b*, and a tilting portion 73*c* formed along the conveying path. The straight portion 73*a* of the second guide rail 73 is formed in parallel with the straight portion 72*a* of the first guide rail 72. The tilting portion 73*c* of the second guide rail 73 is formed in parallel with the tilting portion 72*c* of the first guide rail 72. The radius of curvature of the curved portion 73*b* of the second guide rail 73 is set to be smaller than that of the curved portion 72*b* of the first guide rail 72.

Guide bearings 107 and 108 of the pusher unit 53, which will be discussed later, are pushed against the first guide rail 72 and the second guide rail 73, respectively. The first guide rail 72 and the second guide rail 73 guide the conveying direction of the pusher unit 53.

The cover plate 52 and the rack guide 56 will now be described below.

As shown in FIGS. 2 through 6, the cover plate 52 is disposed above the support table 51 with a predetermined space therebetween. The cover plate 52 opposes the mounting surface 51*a* of the support table 51 in the top-bottom direction. The cover plate 52 is constituted by a member formed in a substantially rectangular planar shape.

A first groove 81 and a second groove 82 are formed in the cover plate 52 along the conveying path. As in the first guide rail 72 and the second guide rail 73, the first groove 81 includes a straight portion 81*a* extending along the second direction Y, a curved portion 81*b*, and a tilting portion 81*c*. As in the first groove 81, the second groove 82 includes a straight portion 82*a*, a curved portion 82*b*, and a tilting portion 82*c*.

An end of the straight portion 81*a* of the first groove in the cover plate 52 on the first side of the second direction Y serves as the loading inlet 39*a* into which a sample rack 90 is loaded. An end of the tilting portion 81*c* of the first groove 81 in the cover plate 52 on the second side serves as the discharge outlet 39*b* from which a sample rack 90 is discharged. The surface of the discharge outlet 39*b* in the cover plate 52 from which a sample rack 90 is supplied to the direction turning portion 33 is on the same level as a surface 52*a*. Because of this configuration, when the direction turning portion 33 turns the conveying direction of a sample rack 90, the sample rack 90 and the arm 33a can be prevented from being caught on the surface 52a of the cover plate 52.

A pusher plate 106 of the pusher unit 53, which will be discussed later, is movably inserted in the first groove 81. A holding plate 110 of the pusher unit 53, which will be discussed later, is movably inserted in the second groove 82. A sample rack 90 is conveyed on the first groove 81 in the cover plate 52.

The rack guide 56 is disposed on the surface 52a of the cover plate 52 along the first groove 81 and the second groove 82. The rack guide 56 includes a first guide plate 84 and a second guide plate 85. The first guide plate 84 is disposed on the first side of the first direction X with respect to the first groove 81, while the second guide plate 85 is disposed on the second side of the first direction X with respect to the first groove 81.

The first guide plate 84 and the second guide plate 85 are formed by plural planar members. The first guide plate 84 and the second guide plate 85 are fixed to the surface 52a of the cover plate 52 via fixing screws. The first guide plate 84 and the second guide plate 85 are substantially perpendicularly raised from the surface 52a of the cover plate 52 upward in the top-bottom direction.

The first guide plate 84 includes a straight portion 84a and a curved portion 84b. The second guide plate 85 includes a straight portion 85a, a curved portion 85b, and a tilting portion 85c. The straight portions 84a and 85a are disposed along the second direction Y on the first side of the second direction Y with respect to the cover plate 52. The curved portions 84b and 85b are disposed on the second side of the second direction Y with respect to the straight portions 84a and 85a.

The straight portion 84a of the first guide plate 84 is disposed above the second groove 82 in the top-bottom direction. A bending portion 84c is formed at the bottom of the straight portion 84a of the first guide plate 84 in the top-bottom direction. The bending portion 84c is disposed above the second groove 82 in the top-bottom direction with a predetermined space therebetween. With this configuration, the holding plate 110 passing through the second groove 82 can be prevented from contacting the first guide plate 84.

The curved portions 84b and 85b are disposed at a curved portion of the conveying path of a sample rack 90 where the conveying direction is changed. The curved portion 84b of the first guide plate 84 is disposed outside the conveying path in the radial direction. The curved portion 85b of the second guide plate 85 is disposed inside the conveying path in the radial direction. The radius of curvature of the curved portion 85b of the second guide plate 85 is set to be the same as that of the curved portion 81b of the first groove 81. In contrast, the radius of curvature of the curved portion 84b of the first guide plate 84 disposed outside the conveying path is set to be greater than that of the curved portion 81b of the first groove 81.

As shown in FIG. 4, a notch 86 is formed in the curved portion 84b of the first guide plate 84. The notch 86 is formed at the bottom side of the curved portion 84b in the top-bottom direction. By providing the notch 86 in the curved portion 84b positioned outside the conveying path, the lower corners of a sample rack 90 in the top-bottom direction can be prevented from being caught at the curved portion 84b of the first guide plate 84.

As shown in FIG. 2, the tilting portion 85c is disposed at the end of the curved portion 85b of the second guide plate 85 opposite the other end close to the straight portion 85a.

The tilting portion 85c is formed in substantially parallel with the tilting portion 81c of the first groove 81 and tilts at a predetermined angle with respect to the second direction Y.

A sample rack 90 conveyed by the pusher unit 53 passes through between the first guide plate 84 and the second guide plate 85. That is, the sample rack 90 is guided from the loading inlet 39a to the discharge outlet 39b by the first guide plate 84 and the second guide plate 85.

The pusher unit 53 will now be described below with reference to FIGS. 7 through 10.

Figure 7:
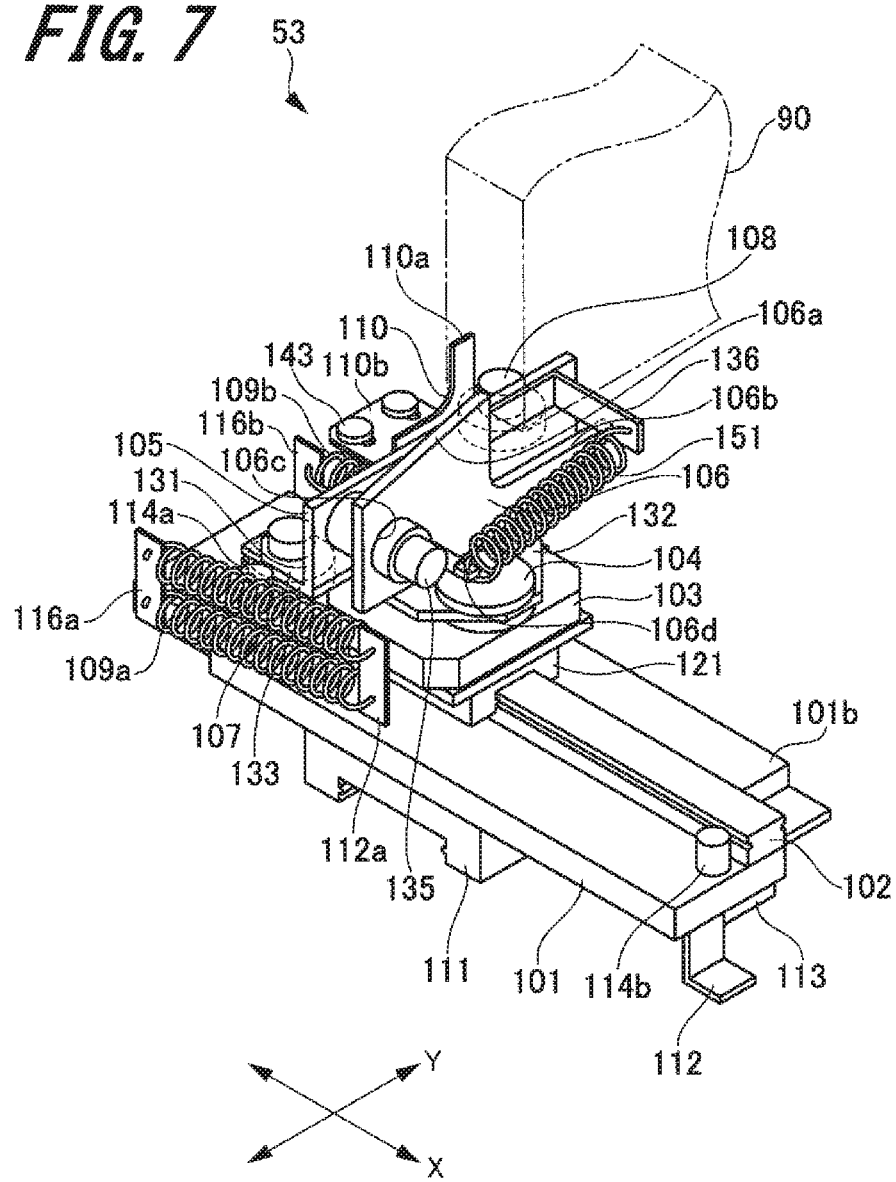
FIG. 7 is a perspective view illustrating a pusher unit of the sample rack conveying apparatus according to the embodiment of the present invention.
Figure 8:
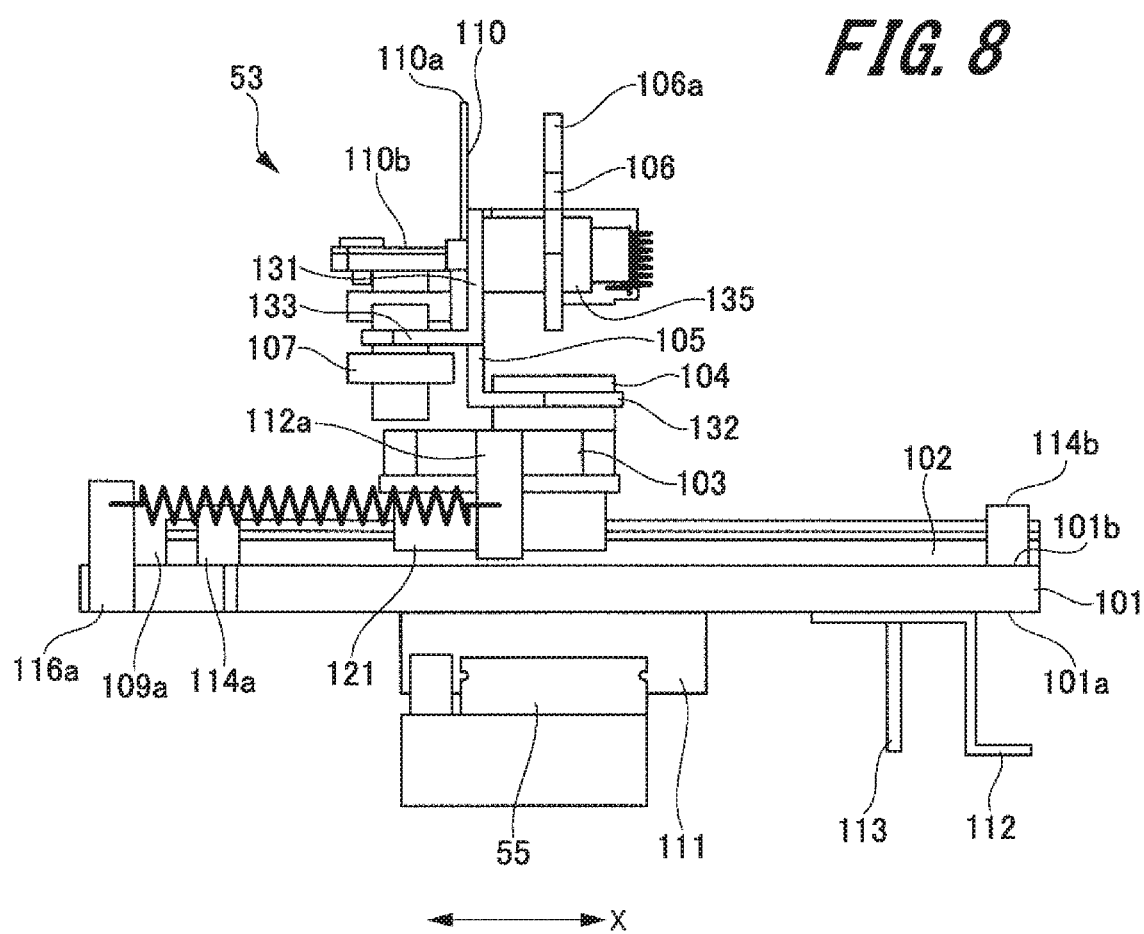
FIG. 8 is a front view of the pusher unit of the sample rack conveying apparatus according to the embodiment of the present invention.
Figure 9:
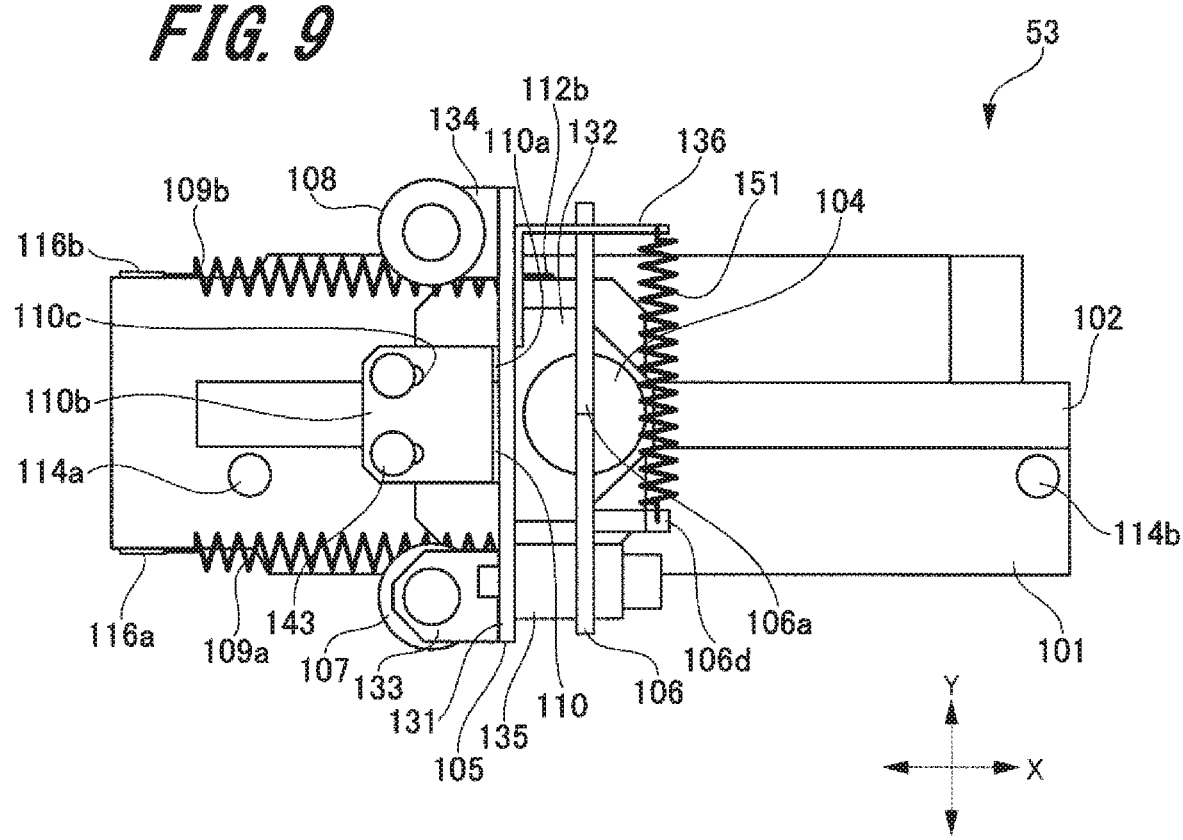
FIG. 9 is a plan view of the pusher unit of the sample rack conveying apparatus according to the embodiment of the present invention.
Figure 10:
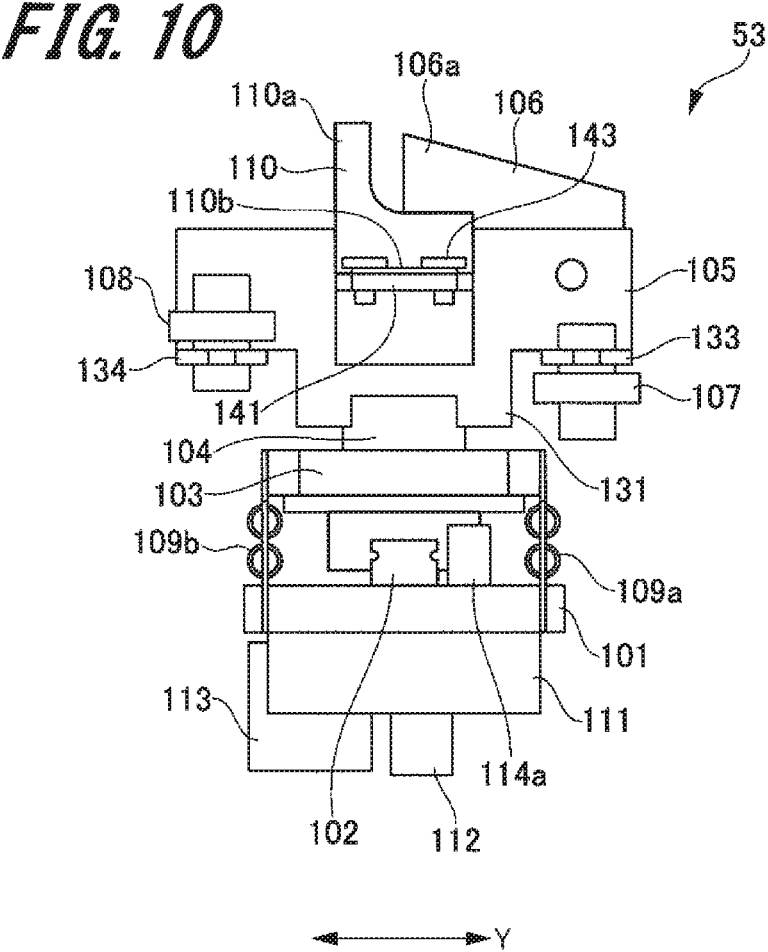
FIG. 10 is a side view of the pusher unit of the sample rack conveying apparatus according to the embodiment of the present invention.

FIG. 7 is a perspective view of the pusher unit 53. FIG. 8 is a front view of the pusher unit 53. FIG. 9 is a plan view of the pusher unit 53. FIG. 10 is a side view of the pusher unit 53.

As shown in FIGS. 7 through 10, the pusher unit 53 includes a base portion 101, a base-side guide 102, a moving member 103, a rotating shaft 104, a rotating plate 105, a pusher plate 106, and a holding plate 110. The pusher unit 53 also includes two guide bearings 107 and 108 and two urging members 109a and 109b. The two urging members 109a and 109b are constituted by tension springs.

The base portion 101 is formed in a substantially rectangular parallelepiped. As shown in FIG. 8, a base-side slider 111, a light-blocking strip 112, and an interconnecting member 113 are fixed on a bottom surface 101a on the lower side of the base portion 101 in the top-bottom direction. The base-side slider 111 is movably supported by the linear motion guide 55. The base portion 101 is thus supported by the linear motion guide 55 such that it is movable along the second direction Y.

With respect to the base portion 101, the light-blocking strip 112 is disposed closer to the second side of the first direction X than the base-side slider 101 is. The light-blocking strip 112 protrudes downward from the bottom surface 101a in the top-bottom direction, and the bottom end portion thereof bends toward the second side of the first direction X.

When the base portion 101 moves along the second direction Y, the light-blocking strip 112 passes between the light-emitting portion and a light-receiving portion of the first sensor 66a, the second sensor 66b, or the third sensor 66c. As a result of light emitted from the light-emitting portion being blocked by the light-blocking strip 112, the first sensor 66a, the second sensor 66b, and the third sensor 66c detect the position of the pusher unit 53.

For example, if light of the first sensor 66a is blocked by the light-blocking strip 112, a controller of the conveying apparatus 30 judges that the pusher unit 53 has reached a start position near the loading inlet 39a. If light of the second sensor 66b is blocked by the light-blocking strip 112, the controller judges that the pusher unit 53 has reached a wait position before a position near the discharge outlet 39b at which the pusher unit 53 transfers a sample rack 90 to the direction turning portion 33. If light of the third sensor 66c is blocked by the light-blocking strip 112, the controller judges that the pusher unit 53 has reached an end position at which the pusher unit 53 transfers a sample rack 90 to the direction turning portion 33.

The interconnecting member 113 is disposed near the base-side slider 111 and protrudes downward from the bottom surface 101a in the top-bottom direction. As shown in FIGS. 5 and 6, the interconnecting member 113 is fixed to the drive belt 64. With this configuration, when the conveyance driver 61 drives to move the drive belt 64, the base portion 101 also moves together with the drive belt 64 along the second direction Y.

As shown in FIGS. 7 and 9, two base-side fixed strips 116a and 116b are fixed at the end of the base portion 101 on the first side of the first direction X. The first base-side fixed strip 116a is fixed to a side surface of the base portion 101 on the first side of the second direction Y. The second base-side fixed strip 116b is fixed to a side surface of the base portion 101 on the second side of the second direction Y. One end of the first urging member 109a is fixed to the first base-side fixed strip 116a, while one end of the second urging member 109b is fixed to the second base-side fixed strip 116b.

As shown in FIG. 9, on a top surface 101b of the upper side of the base portion 101 in the top-bottom direction, the base-side guide 102 and two base-side stoppers 114a and 114b are fixed. The base-side guide 102 is a linear motion guide which extends along the first direction X with respect to the base portion 101. The two base-side stoppers 114a and 114b are disposed near the base portion 101.

The first base-side stopper 114a is disposed on the first side of the first direction X with respect to the base-side guide 102, while the second base-side stopper 114b is disposed on the second side of the first direction X with respect to the base-side guide 102. The first base-side stopper 114a and the second base-side stopper 114b abut against the moving member 103, which will be discussed later, so as to prevent the moving member 103 from dropping from the base-side guide 102.

As shown in FIG. 7, the moving member 103 is formed in a substantially rectangular parallelepiped. A pusher-side slider 121 is provided below the moving member 103 in the top-bottom direction. The pusher-side slider 121 is movably supported by the base-side guide 102. The moving member 103 is thus supported by the base-side guide 102 such that it is movable along the first direction X, which is a second guide direction in this embodiment (see FIG. 11).

The moving member 103 has two pusher-side fixed strips 112a and 112b. The first pusher-side fixed strip 112a is fixed to a side surface of the moving member 103 on the first side of the second direction Y. The second pusher-side fixed strip 112b is fixed to a side surface of the moving member 103 on the second side of the second direction Y. The other end of the first urging member 109a is fixed to the first pusher-side fixed strip 112a. The other end of the second urging member 109b is fixed to the second pusher-side fixed strip 112b.

The moving member 103 is urged toward the first side of the first direction X by an urging force (spring force) of the first urging member 109a and the second urging member 109b. In this embodiment, tension springs are used as the first urging member 109a and the second urging member 109b. However, the first urging member 109a and the second urging member 109b are not restricted to tension springs, and members having various other types of elasticity, such as leaf springs, disc springs, and rubber, may be used.

The rotating shaft 104 is attached to the moving member 103. The rotating shaft 104 is provided on the top portion of the moving member 103 in the top-bottom direction. The rotating plate 105, which is an example of a rotating member, is rotatably supported by the rotating shaft 104.

The rotating plate 105 is formed by bending a planar member at plural portions. The rotating plate 105 includes a main surface portion 131, a main bearing strip 132, a first guide bearing strip 133, and a second guide bearing strip 134.

The main surface portion 131 is formed in a substantially rectangular planar shape. The main surface portion 131 is positioned such that the planar portion faces the first direction X with the longitudinal portion extending along the second direction Y. The main bearing strip 132 is continuously provided from the bottom end of the main surface portion 131 in the top-bottom direction such that it is substantially perpendicular to the main surface portion 131.

The main bearing strip 132 bends from the main surface portion 131 in the first direction X. The main bearing strip 132 is rotatably attached to the rotating shaft 104. The rotating shaft 104 is disposed substantially perpendicularly to the horizontal direction.

As shown in FIGS. 8 through 10, the first guide bearing strip 133 and the second guide bearing strip 134 are continuously provided from the bottom end of the main surface portion 131 in the top-bottom direction such that they are substantially perpendicular to the main surface portion 131. The first guide bearing strip 133 and the second guide bearing strip 134 protrude from the main surface portion 131 toward the first side of the first direction X. The first guide bearing strip 133 is disposed on one side of the main surface 131 in the longitudinal direction, that is, on the first side of the second direction Y. The second guide bearing strip 134 is disposed on the other side of the main surface 131 in the longitudinal direction, that is, on the second side of the second direction Y.

The first guide bearing 107 is attached to the bottom surface of the first guide bearing strip 133. The second guide bearing 108 is attached to the top surface of the second guide bearing strip 134. The first guide bearing strip 133 is disposed on the same level as the second guide bearing strip 134. The first guide bearing 107 is rotatably provided on the first guide bearing strip 133, while the second guide bearing 108 is rotatably provided on the second guide bearing strip 134. The first guide bearing 107 and the second guide bearing 108 are positioned such that the corresponding rotating shafts are substantially perpendicular to the horizontal direction.

The top-bottom distance between the first guide bearing 107 attached to the first guide bearing strip 133 and the second guide bearing 108 attached to the second guide bearing strip 134 is set to be equal to the top-bottom distance between the first guide rail 72 and the second guide rail 73.

As shown in FIG. 6, the first guide bearing 107 abuts against the first guide rail 72 of the unit guide 57, while the second guide bearing 108 abuts against the second guide rail 73 of the unit guide 57. As described above, the moving member 103 is urged toward the first side of the first direction X by the first urging member 109a and the second urging member 109b. Consequently, the first guide bearing 107 and the second guide bearing 108 are pressed against the first guide rail 72 and the second guide rail 73, respectively.

A plate rotating shaft 135 and a pusher stopper 136 are fixed on a surface of the main surface portion 131 on the second side of the first direction X. The plate rotating shaft 135 is disposed on the first side of the second direction Y with respect to the main surface portion 131. The pusher stopper 136 is disposed on the second side of the second direction Y with respect to the main surface portion 131. The plate rotating shaft 135 and the pusher stopper 136 substantially perpendicularly protrude from the surface of the main surface portion 131.

One end of an urging spring 151 is fixed to the pusher stopper 136. The pusher plate 106 is rotatably supported by the plate rotating shaft 135.

As shown in FIG. 7, the pusher plate 106 is formed in a substantially planar shape. The pusher plate 106 includes a pusher strip 106a, which is an example of a pusher, and a stopper strip 106b. The pusher strip 106a is disposed on the first side of the second direction Y with respect to the pusher plate 106, while the stopper strip 106*b* is disposed on the second side of the second direction Y with respect to the pusher plate 106.

The top end of the pusher strip 106*a* in the top-bottom direction tilts such that it continuously decreases from the second side of the second direction Y to the first side of the second direction Y. The pusher strip 106*a* is inserted into the first groove 81 provided in the cover plate 52. The pusher strip 106*a* pushes a sample rack 90 loaded into the loading inlet 39*a* of the emergency sample loading portion 39.

In this embodiment, the planar pusher strip 106*a* is used as a pusher. However, the pusher is not restricted to a planar shape, and a cylindrical or prism-shaped member may be used.

A bearing hole 106*c* is provided near the pusher strip 106*a* of the pusher plate 106. The bearing hole 106*c* is rotatably supported by the plate rotating shaft 135. A spring fixing strip 106*d* is provided near the bearing hole 106*c*.

The spring fixing strip 106*d* is disposed closer to the second side of the second direction Y and farther downward in the top-bottom direction than the bearing hole 106*c* is. The other end of the urging spring 151 is fixed to the spring fixing strip 106*d*. The urging spring 151 is constituted by a tension spring, for example. The urging spring 151 urges the pusher plate 106 so that the pusher strip 106*a* will face upward in the top-bottom direction. As a result of the stopper strip 106*b* abutting against the pusher stopper 136 provided in the rotating plate 105, the rotation of the pusher plate 106 stops.

By pushing the pusher strip 106*a* downward in the top-bottom direction, the pusher plate 106 is rotated in a direction in which the stopper strip 106*b* separates from the pusher stopper 136. Then, the pusher strip 106*a* is withdrawn downward from the surface 52*a* of the cover plate 52 in the top-bottom direction. In this manner, when a sample rack 90 is loaded into the loading inlet 39*a*, it can be loaded without waiting for the pusher unit 53 to return to the start position because the pusher strip 106*a* is withdrawn downward.

A plate fixing portion 141 is provided on the surface of the main surface portion 131 of the rotating plate 105 on the first side of the first direction X. The plate fixing portion 141 protrudes from the surface of the main surface portion 131 on the first side of the first direction X. The holding plate 110 is fixed to the plate fixing portion 141 via fixing screws 143.

The holding plate 110 is formed in a substantially planar shape. The holding plate 110 includes a holding strip 110*a*, which is an example of a holding portion, and a plate fixing strip 110*b*. The holding strip 110*a* protrudes upward in the top-bottom direction from the plate fixing portion 141. The holding strip 110*a* is inserted into the second groove 82 provided in the cover plate 52. When the pusher strip 106*a* presses the rear end of a sample rack 90, the holding strip 110*a* abuts against a side surface of the sample rack 90 positioned outside the conveying path in the radial direction. With this configuration, when the sample rack 90 passes through the curved portion of the conveying path, it can be prevented from separating from the pusher strip 106*a*.

The plate fixing strip 110*b* substantially perpendicularly bends from the bottom end of the holding strip 110*a* in the top-bottom direction. Fixing holes 110*c* into which the fixing screws 143 are inserted are formed in the plate fixing strip 110*b*. The fixing holes 110*c* are elongated holes having a longer length in the first direction X than that in the second direction Y. This makes it possible to adjust the fixing position of the holding plate 110 to the rotating plate 105 in accordance with the width of a sample rack 90.

The motion of the pusher unit 53 configured as described above will now be described below with reference to FIG. 11.

Figure 11:
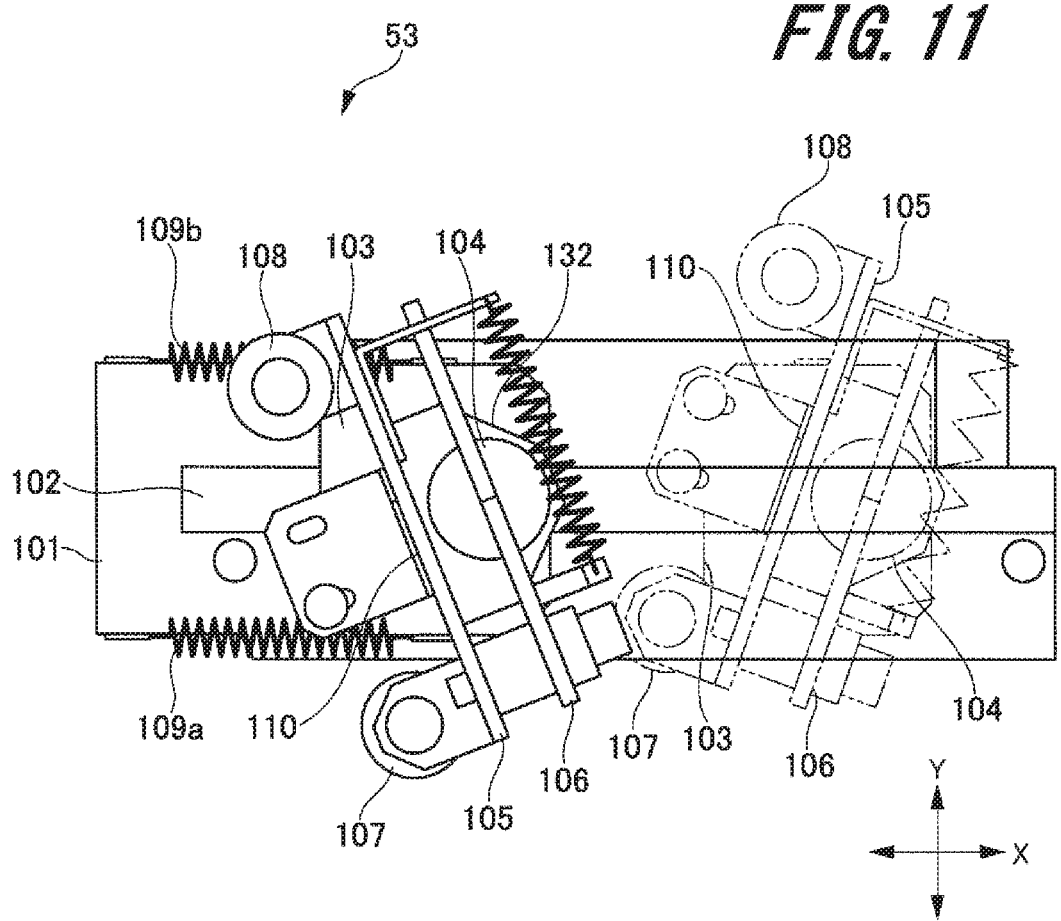
FIG. 11 is a view for explaining the motion of the pusher unit of the sample rack conveying apparatus according to the embodiment of the present invention.

FIG. 11 is a view for explaining the motion of the pusher unit 53.

As shown in FIG. 11, in the pusher unit 53 of this embodiment, the moving member 103 is configured to be movable in the first direction X by the base-side guide 102 provided on the base portion 101. The pusher plate 106 and the rotating plate 105 to which the holding plate 110 is fixed are configured to be rotatable about the rotating shaft 104 provided in the moving member 103.

2. Motion in Emergency Sample Loading Portion of Sample Rack Conveying Apparatus The motion in the emergency sample loading portion 39 configured as described above will now be discussed below with reference to FIGS. 12 and 13.

Figure 12:
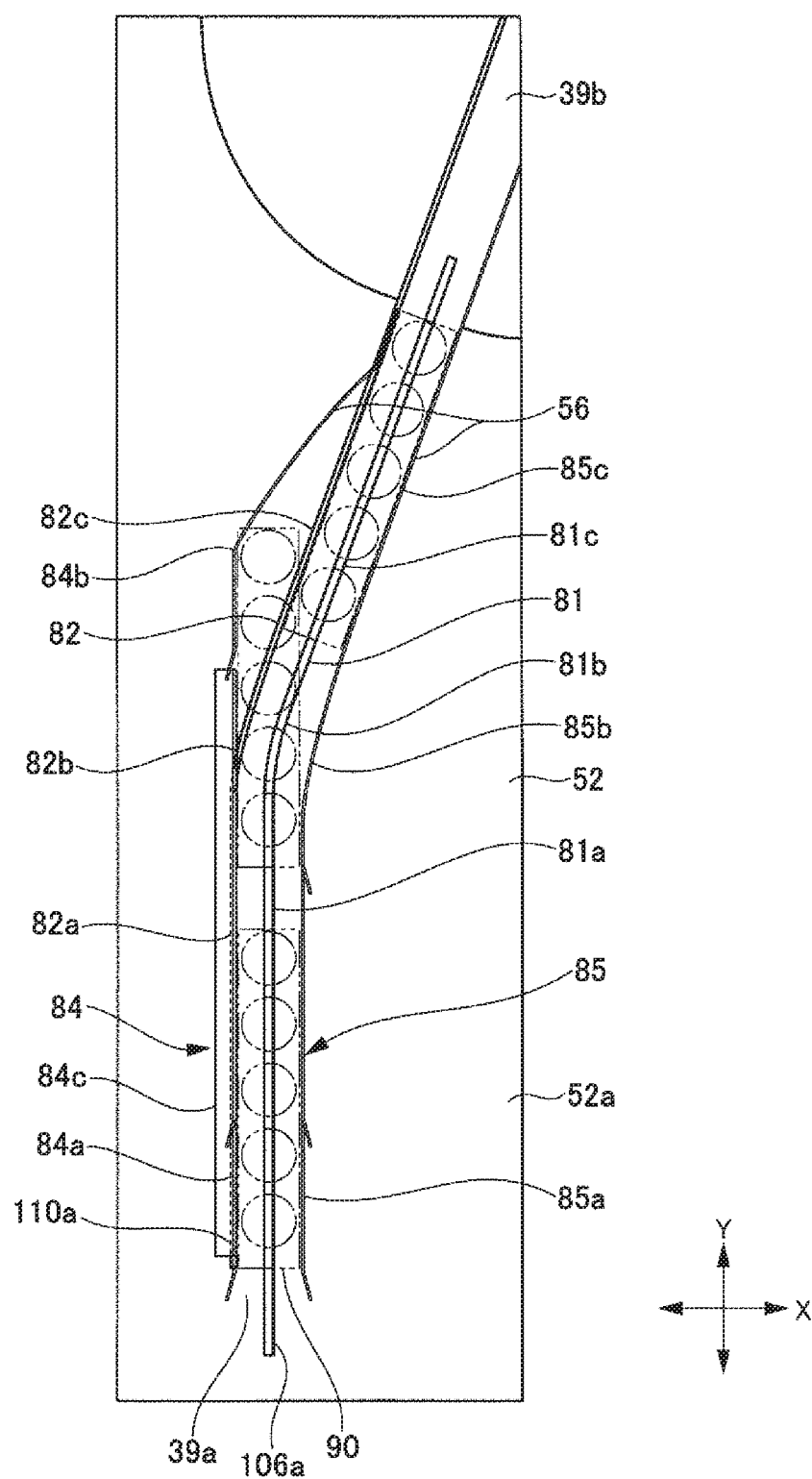
FIG. 12 is a view for explaining the motion of the sample rack conveying apparatus according to the embodiment of the present invention.
Figure 13:
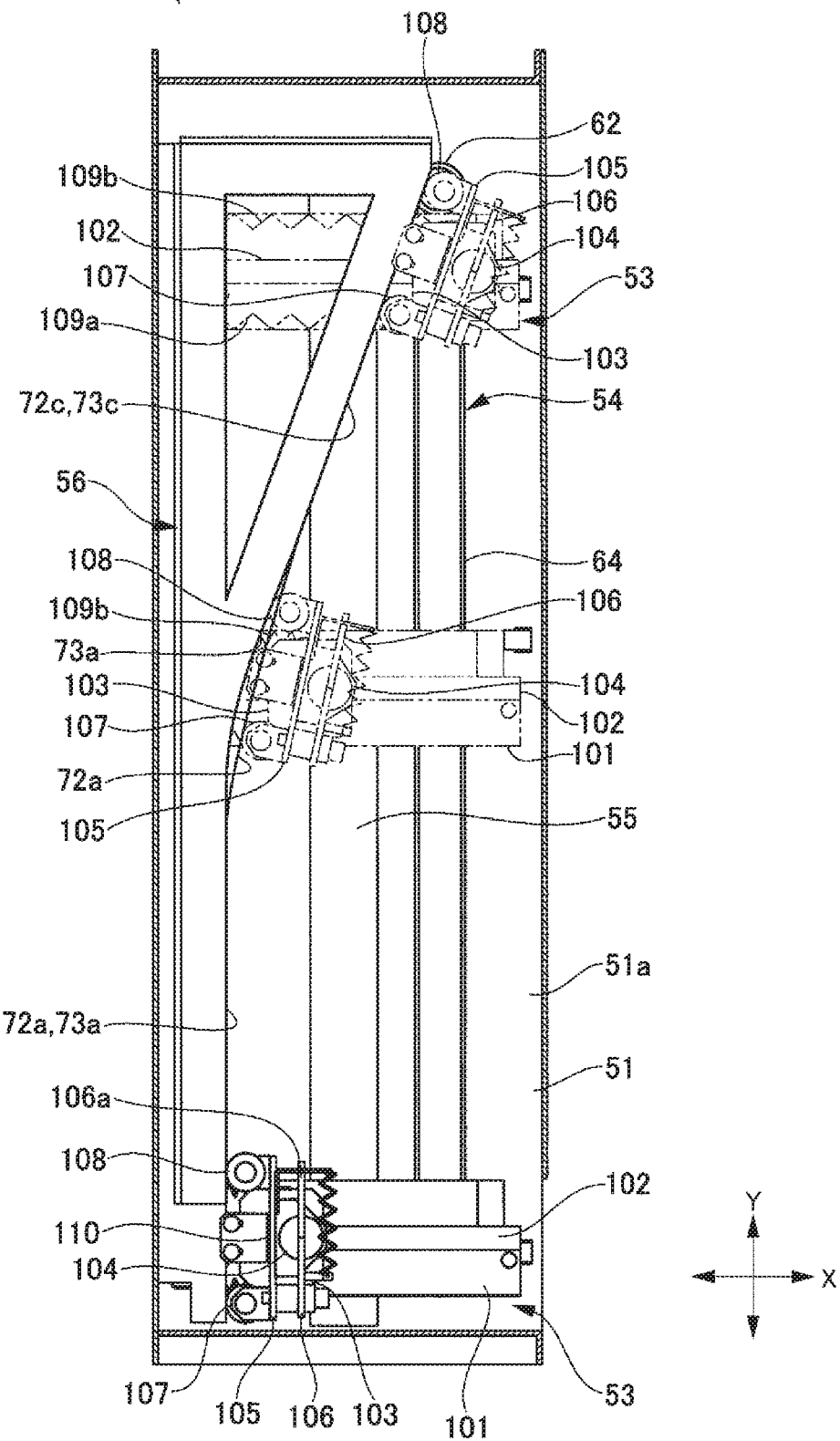
FIG. 13 is a view for explaining the motion of the sample rack conveying apparatus according to the embodiment of the present invention.

FIG. 12 is a view for explaining the motion in the emergency sample loading portion 39. FIG. 13 illustrates the state of the emergency sample loading portion 39 from which the cover plate 52 is removed.

As shown in FIGS. 12 and 13, before a sample rack 90 is conveyed, the pusher unit 53 is located at the start position near the loading inlet 39*a* of the emergency sample loading portion 39. The moving member 103 is urged to the first side of the first direction X by the two urging members 109*a* and 109*b*.

The unit guide 57 is disposed on the first side of the first direction X with respect to the moving member 103. Accordingly, the first guide bearing 107 is pressed against the first guide rail 72, while the second guide bearing 108 is pressed against the second guide rail 73.

The pusher strip 106*a* of the pusher plate 106 passes through the first groove 81 and protrudes upward from the surface 52*a* of the cover plate 52. Likewise, the holding strip 110*a* of the holding plate 110 passes through the second groove 82 and protrudes upward from the surface 52*a* of the cover plate 52. The holding plate 110 is covered by the bending portion 84*c* of the first guide plate 84. The pusher strip 106*a* abuts against the conveying-direction rear end of a sample rack 90 loaded into the loading inlet 39*a*. The holding strip 110*a* abuts against a side surface of the sample rack 90.

When the conveyance driver 61 of the conveyance drive mechanism 54 drives, the drive pulley 62 and the driven pulley 63 are rotated, and the drive belt 64 stretched over the drive pulley 62 and the driven pulley 63 starts to move. The pusher unit 53 interconnected to the drive belt 64 via the interconnecting member 113 moves toward the second side of the second direction Y along the linear motion guide 55. With this operation, a sample rack 90 is pushed by the pusher strip 106*a* and is conveyed to the curved portion of the conveying path. The first guide plate 84 and the second guide plate 85 forming the rack guide 56 are disposed on both sides of the sample rack 90 in the first direction X. The movement of the sample rack 90 in the first direction X is thus restricted.

At the curved portion at which the sample rack 90 has been conveyed, the conveying path of the sample rack 90 is changed along the curved portion 84*b* of the first guide plate 84 and the curved portion 84*a* of the second guide plate 85.

The curved portions 72*b* and 72*b* which are formed along the curved portion of the conveying path are respectively provided in the first guide rail 72 and the second guide rail 73. When the pusher unit 53 has reached the curved portion of the conveying path, the moving member 103 moves toward the second side of the first direction X along the base-side guide 102 by resisting the urging force of the urging members 109a and 109b, and the rotating plate 105 rotates about the rotating shaft 104. The pushing direction of the pusher strip 106a also changes along the conveying path of the sample rack 90.

With this configuration, the pusher strip 106a can constantly abut against the sample rack 90 at right angles. The holding strip 110a abuts against the side surface of the sample rack 90. The conveying direction of the holding strip 110a, as well as that of the pusher strip 106a, also changes. This can prevent the sample rack 90 from separating from the pusher strip 106a when the conveying path of the sample rack 90 is changed. As a result, the pusher strip 106a can stably push and convey the sample rack 90.

The second guide rail abutting against the second guide bearing 108 which is disposed on the leading end of the conveying direction of the pusher unit 53 and the first guide rail abutting against the first guide bearing 107 which is disposed on the trailing end of the conveying direction of the pusher unit 53 are separately provided. The curved portion 72b of the first guide rail 72 is formed in accordance with the path of the first guide bearing 107. The curved portion 73b of the second guide rail 73 is formed in accordance with the path of the second guide bearing 108.

As in a difference generated between a track of an inner front wheel and that of an inner rear wheel of a vehicle when the vehicle turns at a curve, a difference is generated between the path of the first guide bearing 107 and that of the second guide bearing 108 when the first guide bearing 107 and the second guide bearing 108 pass through the curved portion. In accordance with this difference, the radius of curvature of the curved portion 72b of the first guide rail 72 and that of the curved portion 73b of the second guide rail 73 are set to be different. More specifically, the radius of curvature of the curved portion 72b of the first guide rail is set to be smaller than that of the curved portion 73b of the second guide rail 73.

With this configuration, when the pusher unit 53 passes through the curved portion, the rotating plate 105 can smoothly be rotated so as to move the moving member 103. Then, after the pusher unit 53 has passed through the curved portion, the first guide bearing 107 abuts against the tilting portion 72c of the first guide rail 72 and the second guide bearing 108 abuts against the tilting portion 73c of the second guide rail 73. The moving member 103 thus moves toward the second side of the first direction X by resisting the urging force of the urging members 109a and 109b while the angle of rotation of the rotating plate 105 is maintained. This allows the pusher strip 106a to reliably abut against the sample rack at the tilting portion where the conveying path tilts from the second direction Y.

When the pusher unit 53 has reached the end position, the sample rack 90 is conveyed until the discharge outlet 39b at a position at which the sample rack 90 is transferred to the direction turning portion 33.

As described above, by using the emergency sample loading portion 39 of this embodiment, even in a case in which the direction in which a sample rack 90 is loaded and the direction in which the sample rack 90 is discharged are different, the sample rack 90 can reliably be conveyed with a single driver. That is, it is possible to change the conveying direction of a sample rack 90 with the single driver. The conveying direction of a sample rack 90 can be changed between at the loading inlet 39a and at the discharge outlet 39b, thereby making it possible to design a conveying path in accordance with a user demand.

When the pusher unit 53 returns from the end position to the start position, the moving member 103 shifts from the second side to the first side of the first direction X by the urging force of the urging members 109a and 109b. The rotating plate 105 is rotated in a direction opposite the direction when a sample rack 90 is conveyed. Thereafter, the motion of the pusher unit 53 is simply reverse to that when the sample rack 90 is conveyed, and an explanation thereof will be omitted.

The present invention is not restricted to the embodiment described above and illustrated in the drawings. Various modifications may be made without departing from the spirit and scope of the invention recited in the claims. For example, in the above-described embodiment, the invention is applied to the emergency sample loading portion 39. However, the invention is not restricted to this configuration. The invention may be applied to the first conveyor lane, the second conveyor lane, the recovery conveyor, the sample loading lane, and the rack discharge lane in the sample rack conveying apparatus.

In the above-described embodiment, two guide rails are provided as the unit guide, and two guide bearings are provided in the pusher unit. However, the invention is not restricted to this configuration. For example, three or more guide rails and three or more guide bearings may be provided, or one guide rail and one guide bearing may be provided.

In the above-described embodiment, the pusher plate is rotatably supported together with the rotating plate. However, the invention is not restricted to this configuration. The pusher plate may be fixed to the moving member. In this case, the pusher plate does not rotate but moves only in the first direction and in the second direction.

In this embodiment, the second guide direction (first direction X) of the base-side guide for guiding the movement of the moving member crosses the first guide direction (second direction Y) of the linear motion guide at right angles. However, the second guide direction does not necessarily cross the first guide direction at right angles. The second guide direction of the base-side guide is only required to cross the first guide direction of the linear motion guide.

The angle at which the conveying direction of a sample rack is changed is not restricted to the angle discussed in the above-described embodiment. The angle is set variously in accordance with the apparatus. The conveying direction of a sample rack may be changed by 90 degrees or greater or by smaller than 90 degrees.

The automated analysis apparatus is applied to a biochemical analysis apparatus used for analyzing biological samples, such as blood and urine. However, the automated analysis apparatus is not restricted to this type of apparatus, and may be applicable to apparatuses for conducting analysis for different purposes, such as those for analyzing food and the quality of water.

REFERENCE SIGNS LIST 1 biochemical analysis apparatus (automated analysis apparatus), 30 sample rack conveying apparatus, 31 supply tray, recovery tray, 33 direction turning portion, 34 first conveyor lane, 35 recovery conveyor, 36 second conveyor lane, 37 lane changing portion, 38 sample loading lane, 39 emergency sample loading portion, 51 support table, 51a mounting surface, 52 cover plate, 53 pusher unit, 54 conveyance drive mechanism, linear motion guide, 56 rack guide, 57 unit guide, 61 conveyance driver, 72 first guide rail, 73 second guide rail, 81 first groove, 82 second groove, 84 first guide plate, 85 second guide plate, 90 sample rack, 91 rack-side sample container, 100 biochemical analysis system, 101 base portion, 102 base-side guide, 103 moving member, 104 rotating shaft, 105 rotating plate (rotating member), 106 pusher plate, 106a pusher strip (pusher), 107 first guide bearing, 108 second guide bearing, 109a, 109b urging member, 110 holding plate, 110a holding strip (holding portion), 111 base-side slider, 113 interconnecting member, 121 pusher-side slider, 131 main surface portion, 135 plate rotating shaft, X first direction (second guide direction), Y second direction (first guide direction)

The invention claimed is:

1. A sample rack conveying apparatus comprising:
a pusher unit that pushes a sample rack in which a sample container is stored so as to convey the sample rack;
a linear motion guide that supports the pusher unit such that the pusher unit is movable in a first guide direction;
a single conveyance drive mechanism that moves the pusher unit in the first guide direction,
the pusher unit including:
a base portion which is supported by the linear motion guide so as to be movable in the first guide direction,
a moving member which is provided with a pusher which presses the sample rack,
a base-side guide which is provided on the base portion and which supports the moving member such that the moving member is movable in a second guide direction which crosses the first guide direction,
a rotating shaft provided on the moving member, and
a rotating member supported by the rotating shaft so as to be rotatable within a plane formed by the first guide direction and the second guide direction,
wherein the pusher is fixed to the rotating member, so as to be rotatable within the plane formed by the first guide direction and the second guide direction as the rotating member rotates; and
a unit guide that guides the moving member in the first guide direction and in the second guide direction,
wherein the pusher unit includes an urging member which urges the moving member to the unit guide, and
wherein the moving member is driven by the conveyance drive mechanism to move in the second guide direction by being supported by the base-side guide.

2. The sample rack conveying apparatus according to claim 1, wherein:
the pusher unit includes
a first guide bearing which is rotatably provided on a first side of the moving member, and
a second guide bearing which is rotatably provided on a second side of the moving member; and
the unit guide includes
a first guide rail against which the first guide bearing abuts, and
a second guide rail against which the second guide bearing abuts.

3. The sample rack conveying apparatus according to claim 2, wherein:
a curvature of a curved portion of the first guide rail is set in accordance with a path along which the first guide bearing moves, the curved portion of the first guide rail being a portion at which a conveying path of the sample rack turns; and
a curvature of a curved portion of the second guide rail is set in accordance with a path along which the second guide bearing moves, the curved portion of the second guide rail being a portion at which the conveying path of the sample rack turns.

4. The sample rack conveying apparatus according to claim 1, wherein the pusher unit includes a holding portion which abuts against a side surface of the sample rack, the sample rack being conveyed through a curved portion of a conveying path to a linear portion, the curved portion being a portion at which the conveying path of the sample rack turns.

5. The sample rack conveying apparatus according to claim 1, further comprising:
a rack guide that guides conveying of the sample rack.

6. An automated analysis system comprising:
an automated analysis apparatus that analyzes a sample stored in a sample container; and
a sample rack conveying apparatus that conveys a sample rack in which the sample container is stored,
the sample rack conveying apparatus including:
a pusher unit that pushes a sample rack in which a sample container is stored so as to convey the sample rack;
a linear motion guide that supports the pusher unit such that the pusher unit is movable in a first guide direction;
a single conveyance drive mechanism that moves the pusher unit in the first guide direction,
the pusher unit including:
a base portion which is supported by the linear motion guide so as to be movable in the first guide direction,
a moving member which is provided with a pusher which presses the sample rack,
a base-side guide which is provided on the base portion and which supports the moving member such that the moving member is movable in a second guide direction which crosses the first guide direction,
a rotating shaft provided on the moving member, and
a rotating member supported by the rotating shaft so as to be rotatable within a plane formed by the first guide direction and the second guide direction,
wherein the pusher is fixed to the rotating member, so as to be rotatable within the plane formed by the first guide direction and the second guide direction as the rotating member rotates; and
a unit guide that guides the moving member in the first guide direction and in the second guide direction,
wherein the pusher unit includes an urging member which urges the moving member to the unit guide, and
wherein the moving member is driven by the conveyance drive mechanism to move in the second guide direction by being supported by the base-side guide.

* * * * *